United States Patent
Sumita et al.

(10) Patent No.: US 8,005,423 B2
(45) Date of Patent: Aug. 23, 2011

(54) WIRELESS COMMUNICATION SYSTEM INCLUDING A SERVER DEVICE AND MULTIPLE RELAY DEVICES

(75) Inventors: Naoki Sumita, Hino (JP); Kiyoshi Takei, Inagi (JP); Masamichi Izumida, Ryugasaki (JP)

(73) Assignee: Seiko Epson Corporation (JP)

( * ) Notice: Subject to any disclaimer, the term of this patent is extended or adjusted under 35 U.S.C. 154(b) by 822 days.

(21) Appl. No.: 11/971,273

(22) Filed: Jan. 9, 2008

(65) Prior Publication Data

US 2008/0171511 A1 Jul. 17, 2008

(30) Foreign Application Priority Data

Jan. 12, 2007 (JP) ................................. 2007-005146

(51) Int. Cl.
 *H04B 3/38* (2006.01)
 *H04W 4/04* (2009.01)
 *H04W 4/08* (2009.01)
 *H04W 64/00* (2009.01)

(52) U.S. Cl. ........ 455/15; 455/25; 455/41.2; 455/456.1; 340/7.46

(58) Field of Classification Search ........................ None
 See application file for complete search history.

(56) References Cited

U.S. PATENT DOCUMENTS

| | | | |
|---|---|---|---|
| 6,529,786 | B1 | 3/2003 | Sim |
| 7,693,534 | B1* | 4/2010 | Lundy et al. ............... 455/518 |
| 7,738,898 | B2* | 6/2010 | Aaron ........................ 455/519 |
| 2003/0093167 | A1 | 5/2003 | Sim |
| 2004/0202116 | A1* | 10/2004 | Wienold et al. ............ 370/310 |
| 2006/0009249 | A1* | 1/2006 | Fu et al. ..................... 455/518 |
| 2006/0103507 | A1* | 5/2006 | Forsberg .............. 455/41.2 X |
| 2007/0263560 | A1* | 11/2007 | Saarisalo et al. ........... 370/328 |

FOREIGN PATENT DOCUMENTS

| | | |
|---|---|---|
| JP | 07-020237 | 1/1995 |
| JP | 09-062948 | 3/1997 |
| JP | 2000-500934 | 1/2000 |
| JP | 2001-160117 | 6/2001 |
| JP | 2001-195474 | 7/2001 |
| JP | 2005-141673 | 6/2005 |

* cited by examiner

*Primary Examiner* — Philip J Sobutka
(74) *Attorney, Agent, or Firm* — Harness, Dickey & Pierce, P.L.C.

(57) ABSTRACT

A communication system includes: a plurality of mobile communication terminals; a server device; and a plurality of relay devices performing a relay between the plurality of mobile communication terminals and the server device. The mobile communication terminals include: a communication unit transmitting and receiving a long wave wirelessly, and a processing unit performing a predetermined process based on received information. The relay devices include: a first communication unit transmitting and receiving the long wave wirelessly with respect to the mobile communication terminals, a second communication unit communicating with the server device, and a relay processing unit performing a relaying process in which information received from the server device via the second communication unit is transmitted to the mobile communication terminals via the first communication unit, and a relaying process in which information received from the mobile communication terminals via the first communication unit to the server device via the second communication unit. The server device includes: a communication unit communicating with the relay devices, a group information storing unit storing group information on a group to which the mobile communication terminals belong, and a group communication processing unit performing a group communication process in which mobile communication terminals that belong to a predetermined group are extracted based on the group information so as to transmit predetermined information to the mobile communication terminals that are extracted.

8 Claims, 17 Drawing Sheets

WIRELESS COMMUNICATION SYSTEM INCLUDING A SERVER DEVICE AND MULTIPLE RELAY DEVICES

The entire disclosure of Japanese Patent Application No. 2007-005146, filed Jan. 12, 2007 is expressly incorporated by reference herein.

BACKGROUND

1. Technical Field

The present invention relates to a communication system and a mobile communication terminal.

2. Related Art

A radio frequency tag (RF-TAG) has been studied for entry/exit management as disclosed in JP-A-2001-160117, for example. However, the RF-TAG has been applied only as a tag, and it has not been able to be used for bidirectional information exchange, especially for information sharing and communication among a plurality of members.

In a case where a group including a plurality of members visits a huge theme park or an amusement park, the members sometimes separate into small groups or individuals, and gather as the occasion. In that case, they usually communicate with each other with a mobile phone and the like. However, they can communicate only in one to one with the mobile phone and the like, and it is hard for them to keep contacting each member constantly.

Common radio tags can be constantly operated to be used for the entry/exit management with respect to an area, but a function that information is transmitted to a person possessing a tag has not been achieved.

SUMMARY

An advantage of the present invention is to provide a communication system and a mobile communication terminal with which one-to-many and many-to-many information exchange can be achieved among a group including a plurality of members (users) scattering in a predetermined area.

(1) A communication system according to a first aspect of the invention includes: a plurality of mobile communication terminals; a server device; and a plurality of relay devices performing a relay between the plurality of mobile communication terminals and the server device. The mobile communication terminals include: a communication unit transmitting and receiving a long wave wirelessly, and a processing unit performing a predetermined process based on received information. The relay devices include: a first communication unit transmitting and receiving the long wave wirelessly with respect to the mobile communication terminals, a second communication unit communicating with the server device, and a relay processing unit performing a relaying process in which information received from the server device via the second communication unit is transmitted to the mobile communication terminals via the first communication unit, and a relaying process in which information received from the mobile communication terminals via the first communication unit to the server device via the second communication unit. The server device includes: a communication unit communicating with the relay devices, a group information storing unit storing group information on a group to which the mobile communication terminals belong, and a group communication processing unit performing a group communication process in which mobile communication terminals that belong to a predetermined group are extracted based on the group information so as to transmit predetermined information to the mobile communication terminals that are extracted.

Processes of the processing unit of the mobile communication terminal may include: discriminating whether the received information is for the own device or not; transmitting an acknowledge with respect to the received information; allowing a storing part to store the received information for using it, for example, as authentication data and for recording; downloading the received information; and outputting an image, a sound, and vibration based on the received information.

The mobile communication terminal may include a terminal ID storing unit storing a terminal ID that is terminal discrimination information of its own device so as to determine whether the received communication data is for the own device or not based on the terminal ID.

The group information storing unit stores information showing which group the mobile communication terminals belong to or information of the mobile communication terminals that constitute the group. For example, the group information storing unit may store a group ID of the group to which each of the mobile communication terminals belongs while correlating it with the discrimination ID of each of the mobile communication terminals.

If an event in which predetermined information is transmitted to a predetermined group occurs, for example, the group communication processing unit of the server device may extract one or a plurality of mobile communication terminals belonging to the predetermined group based on group information. Then the predetermined information is transmitted to the mobile communication terminals that are extracted.

Further, the group communication processing unit may extract other mobile communication terminals belonging to the same group as a predetermined mobile communication terminal based on the group information. Then the predetermined information may be transmitted to the mobile communication terminals that are extracted.

To the mobile communication terminals that are extracted, the server device may transmit the predetermined information in unicast while designating discrimination IDs or IP addresses of the terminals as destination addresses, or transmit the predetermined information in multicast while designating a group ID of the group or an IP address for the group.

"Multicast" means to transmit information simultaneously to a plurality of nodes that are predetermined, and is used for sending to the plurality of nodes all at once. The destination address that is used in the case is called a multicast address.

The multicast is similar to broadcast functionally. However, information is transmitted to all nodes on a certain network by the broadcast, while information is transmitted to only a host that requires a multicast reception (that is ready for receiving) with the use of a specified address for the multicast (a multicast address) by the multicast.

"Unicast" is a communication method in which one specified node is a target in communication.

The relay devices can communicate with mobile communication terminals that are present within a predetermined distance from the relay devices. A plurality of the relay devices are placed in an application area of the communication system of the aspect, so that the server device can communicate with mobile communication terminals that are present within a predetermined range.

According to the aspect, the server device has a group information, so that the server device can extract mobile communication terminals belonging to a predetermined group so as to transmit predetermined information to the mobile communication terminals that are extracted.

Therefore, such communication system can be provided that information can be transmitted automatically to a group including a plurality of users who scatter in a predetermined area.

(2) A communication system according to a second aspect of the invention includes: a plurality of mobile communication terminals; a server device; and a plurality of relay devices performing a relay between the plurality of mobile communication terminals and the server device. The mobile communication terminals include: a communication unit performing transmission and reception wirelessly, and a processing unit performing a predetermined process based on received information. The relay devices include: a first communication unit performing transmission and reception wirelessly with respect to the mobile communication terminals, a second communication unit communicating with the server device, and a relay processing unit performing a relaying process in which information received from the server device via the second communication unit is transmitted to the mobile communication terminals via the first communication unit, and a relaying process in which information received from the mobile communication terminals via the first communication unit to the server device via the second communication unit. The server device includes: a communication unit communicating with the relay devices, a group information storing unit storing group information on a group to which the mobile communication terminals belong, and a group communication processing unit performing a group communication process in which mobile communication terminals that belong to a predetermined group are extracted based on the group information so as to transmit a predetermined information to the mobile communication terminals that are extracted.

(3) In the communication system of the aspect, the group communication processing unit of the server device may transmit communication data to be transmitted to the plurality of the mobile communication terminals that belong to the predetermined group together with information for specifying the predetermined group in at least one of broadcast and multicast. In addition, the processing unit of the mobile communication terminals may include a belonging group information storing unit storing belonging group information for specifying an own belonging group, and determine whether the communication data that is received is for the own belonging group or not based on the belonging group information and information for specifying a predetermined group. The information for specifying a predetermined group is appended to the communication data which is received. In a case where the processing unit determines that the information is for the own belonging group, the processing unit may perform a predetermined process.

"Broadcast" is a communication method in which a packet is transmitted to all nodes that are present on a network and is also called simultaneous multicast communication. In the broadcast, all nodes are the transmission targets on the network unlike the multicast. The destination address that is used in the case is called a broadcast address.

The server device may transmit information with the use of the broadcast address or the multicast address. In a case where communication data is transmitted with the broadcast address, information for specifying a predetermined group such as a group ID may be appended to the communication data so as to enable the terminals to determine which group of the mobile communication terminals the communication data is transmitted for. In a case where communication data is transmitted with the multicast address, information for specifying a predetermined group such as a group ID may be appended to the communication data. Thus the terminals can determine which group of the mobile communication terminals the communication data is transmitted for, or determine whether the communication data is for the own belonging group or not with the multicast address of the belonging group used as information for specifying a predetermined group.

According to the aspect, the communication data is transmitted in broadcast or in multicast, so that the communication data can be transmitted to all mobile communication terminals belonging to a group by one communication. Therefore, the communication can be performed efficiently in a short period of time compared to a case where the data is individually transmitted to all the terminals belonging to the group in unicast, for example. Especially in the aspect, since the communication is performed with a long wave between the relay devices and the mobile communication terminals, it takes long period of time to transmit the data individually in unicast. However, the transmission of the data in broadcast or in multicast can reduce the communication time substantially.

(4) In the communication system of the aspect, the server device may include a terminal position management unit that checks which relay device receives the communication data from the mobile communication terminals and transmit the data to the server device so as to determine positions of the mobile communication terminals and performs a position information updating process of the mobile communication terminals based on a result of the determination.

In the aspect, since the relay devices perform a short range bidirectional communication with the mobile communication terminals, the mobile communication terminals are present within a range where the terminals can communicate with the relay devices that have received transmission data from the terminals.

The terminal position management unit of the server device checks which relay device the communication data from the mobile communication terminals is routed through so as to be able to have current position information of the mobile communication terminals (recognize which relay device the mobile communication terminals can communicate with).

In terms of judging which relay device the communication data of the mobile communication terminals is routed through, when the relay devices transmit the communication data received from the mobile communication terminals to the server device, the relay devices may append their discrimination IDs on the data. Thus the determination may be carried out depending on the appended discrimination IDs of the relay devices.

The server device may store terminal information for each terminal (terminal discrimination information or current position information, for example). Then the terminal position management unit of the server device may determine the position of each of the mobile communication terminals so as to update the current position information depending on the determination result.

According to the aspect, the server device checks which relay device the communication data from the mobile communication terminals is routed through so as to be able to have the position information of each of the mobile communication terminals.

In a case where the current position information of each of the mobile communication terminals satisfies a certain condition, the server device may transmit notifying data, for example, to each of the terminals or to the group to which each of the terminals belongs.

The relay devices may include a position detecting unit for performing position detecting process such that position detection information on the position of the mobile communication terminals is produced so as to transmit the information through a server communication unit to the server device, based on information received from the mobile communication terminal through the first communication unit. The terminal position management unit of the server device may perform an updating process of information on the position of the mobile communication terminals based on the position detection information from the relay devices.

(5) In the communication system of the aspect, the terminal position management unit of the server device may determine whether information on a position of one mobile communication terminal satisfies a predetermined condition, and in a case where the information satisfies the predetermined condition, the terminal position management unit may transmit notifying information to at least one of the one mobile communication terminal and other terminals belonging to a group to which the one mobile communication terminal belongs.

(6) In the communication system of the aspect, the relay devices may include a call processing unit that performs calling transmission for confirming presence of the terminals therearound by predetermined timing and enters a reception mode for a predetermined period after the call transmission so as to receive a response with respect to the calling transmission. Further, if the processing unit of the mobile communication terminals receives the calling transmission, the processing unit may perform a transmission process for a response.

The calling transmission may be carried out by a predetermined interval or may be carried out when a predetermined event occurs (in a case where there is information to be transmitted or a case where the relay devices receive transmission data, for example).

In terms of the calling transmission, the relay device may transmit a calling data packet in unicast while designating a destination terminal ID, in multicast while designating a destination group ID, or in broadcast while designating broadcast IDs of all terminals.

The relay devices carry out the calling transmission by a predetermined interval and transmit the response data with respect to the calling transmission to the server device, so that the server device can check current positions of the mobile communication terminals by a predetermined interval.

(7) In the communication system of the aspect, the terminal position management unit of the server device may select the relay device for the communication data to be transmitted to the mobile communication terminals based on the information on the positions of the mobile communication terminals so as to transmit the communication data to the mobile communication terminals via the relay device that is selected.

Accordingly, the server device transmits the communication data for the mobile communication terminal only to the selected relay device, so that the communication can be carried out efficiently.

(8) In the communication system of the aspect, each of the relay devices may include a loop antenna capable of receiving a communication wave from the mobile communication terminals that are present in an area that is assigned to each of the relay devices. Further, the terminal position management unit of the server device may check which relay device receives the communication data from the mobile communication terminals and transmits the data to the server device so as to determine an area where the mobile communication terminals are present and perform the position information updating process of the information on the presence area of the mobile communication terminals based on a result of the determination.

The server device may maintain information on the presence area of the mobile communication terminals as information on the positions of the mobile communication terminals.

According to the aspect, the loop antenna is placed at the circumference of each of the areas as the relay device, so that the server device can receive transmission information from the mobile communication terminals that are present in each area, being able to recognize which mobile communication terminal is present in each area.

The loop antenna may be a loop antenna that can surround all around an area of more than a dozen meters square. If a current flows on one from the mobile communication terminals and the relay devices when the mobile communication terminals are present in the area, a current flows on the other from the mobile communication terminals and the relay devices due to electromagnetic induction. Thus the mobile communication terminals can communicate with the relay devices.

(9) In the communication system of the aspect, the plurality of relay devices further includes: a first relay device that is placed at a first side of a predetermined gate and includes a first coil antenna capable of receiving a communication wave from the mobile communication terminals that are present in a predetermined area of the first side of the gate; and a second relay device that is placed at a second side, the second side being opposite to the first side, of the predetermined gate and includes a second coil antenna capable of receiving a communication wave from the mobile communication terminals that are present in a predetermined area of the second side of the gate. In addition, the terminal position management unit of the server device determines whether the mobile communication terminals pass the predetermined gate or not based on the communication data from the first relay device and the second relay device and performs an updating process of information on the passage of the mobile communication terminals through the predetermined gate based on a result of the determination.

The first side and the second side of the predetermined gate may be an entrance side and an exit side of the predetermined gate, for example.

The server device may maintain information on whether the mobile communication terminals pass the predetermined gate or not as information in terms of the positions of the mobile communication terminals.

According to the aspect, the coil antennas are placed at both sides of the gate as the first relay device and the second relay device so as to receive transmission information from the mobile communication terminals that are present at the both sides of the gate. Thus the server device can recognize whether the mobile communication terminals pass the predetermined gate or not.

The first coil antenna and the second coil antenna may each have a several centimeters diameter, for example. If a current flows at one from the mobile communication terminals and the relay devices when the mobile communication terminals are present within a predetermined distance from the first coil antenna and the second coil antenna, a current flows on the other from the terminals and the relay devices due to the electromagnetic induction. Thus the mobile communication terminals can communicate with the relay devices.

If the server detects that one of the first relay device and the second relay device communicates with a predetermined mobile communication terminal after the detection that the other of the first and second relay devices has communicated with the predetermined mobile communication terminal, the terminal position management unit of the server device may determine that the predetermined mobile communication terminal has passed the gate.

(10) A mobile communication terminal may be used for the communication system according to the aspect.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment of the present invention will be described below. Note that the embodiment hereinafter described will not unduly limit the invention described in claims. Moreover, all of the structures to be described below are not necessarily indispensable components for the present invention.

1. Configuration of Communication System

Figure 1:
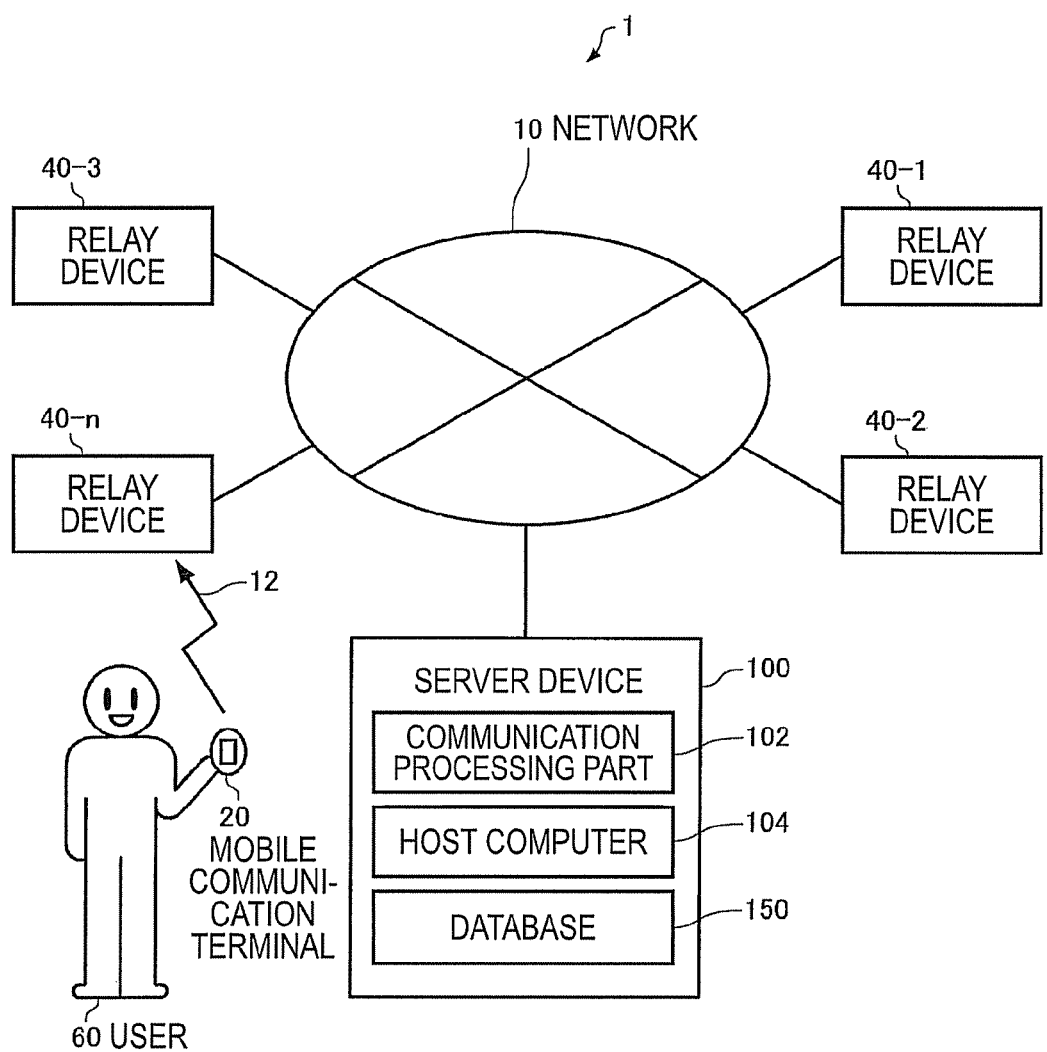
FIG. 1 is a diagram for explaining an example of a configuration of a communication system according to an embodiment of the invention.

FIG. 1 is a diagram for explaining an example of a configuration of a communication system according to a present embodiment.

This communication system 1 according to the embodiment includes a plurality of mobile communication terminals 20, a server device 100, and a plurality of relay devices 40-1, 40-2, . . . 40-n for carrying out a relay of communication between the mobile communication terminals 20 and the server device 100.

The mobile communication terminals 20 include a communication unit that transmits and receives a long wave wirelessly and a process unit that carries out a predetermined process based on received information.

The relay devices 40-1, 40-2, . . . 40-n include a first communication unit, a second communication unit, and a relay processing unit. The first communication unit transmits and receives a long wave wirelessly with respect to the mobile communication terminals. The second communication unit communicates with the server device. The relay processing unit carries out relaying of communication in which information received from the server device via the second communication unit is transmitted to the mobile communication terminals via the first communication unit, and carries out relaying of communication in which information received from the mobile communication terminals via the first communication unit to the server device via the second communication unit.

The first communication unit of the relay device can be any communication unit as long as the unit realizes bidirectional short-range communication employing a long wave with the mobile communication terminals that are within a predetermined range from the relay devices. The first communication unit can be realized with a loop antenna placed in a predetermined area (can be a loop antenna surrounding a predetermined area having more than a dozen meters square or dozens of centimeters square) and a transmission/reception device employing a long wave and coupled with the loop antenna, for example.

The second communication unit of the relay device communicates with the server device. The second communication unit may include a wireless transmission channel and also may be coupled with the server by a wired transmission channel. The second communication unit may employ a common line or a dedicated line.

The relay processing unit may be a coupling part that couples the transmission/reception device that employs a long wave and is coupled to the loop antenna, for example, with a line of the server device or may be a router.

The server device 100 includes a communication processing part 102, a host computer 104, and a database 150. They serve as a communication unit communicating with the relay devices; a group information storing unit storing group information on a group to which the mobile communication terminals belong; and a group communication processing unit that extracts the mobile communication terminals belonging to a predetermined group depending on the group information so as to transmit a predetermined information to the mobile communication terminals that are extracted.

Here, the "long wave" indicates an electric wave having a frequency of a long wave band (from 30 kHz to 300 kHz). The LF is in a range from 10 km to 1 km, but the electric wave in 125 kHz band may be employed. The communication unit of the mobile communication terminals and the first communication unit of the relay devices may perform the transmission/reception with electromagnetic induction of a medium frequency.

The communication unit of the mobile communication terminals may be any communication unit as long as the unit realizes bidirectional short-range communication employing a long wave with the relay devices that are present within a predetermined range. The communication unit may be realized by a coil antenna and a transmission/reception device (IC) coupled to the coil antenna, for example, in the inside of the mobile communication terminals.

The server device 100 is coupled with each of the relay devices 40-1, . . . , and 40-n through a network 10 such as LAN and the Internet. The network 10 may include a wireless transmission channel and a wired transmission channel. The transmission channel may employ a common line or a dedicated line.

The mobile communication terminals 20 may be coupled with the relay devices 40-1, . . . , and 40-n through a wireless network 12 such as Bluetooth, PHS, wireless LAN, a communication using RFID and reader/writer (any of contact communication employing static induction of a high frequency, short-range communication employing electromagnetic induction of a high frequency, proximity communication employing electromagnetic induction of a long wave, microwave communication employing electromagnetic induction of a microwave, and the like), and the Internet (i-mode (registered trademark) of a mobile phone, for example).

A wireless transmitter 30 may be built in a name plate or an ID card belonging to users. The wireless transmitter 30 may be a wireless tag (RFID, for example) or a noncontact IC card.

The noncontact IC card means an IC card incorporating a chip that reads data without bringing a terminal of a card into contact with a terminal of a machine. If the data is brought closer to a device for reading data, the reading device and the IC card exchange the data wirelessly. A coil serving as an antenna is built in the card. Therefore, if the card is held in a magnetic field generated from the reader/writer of the reading device, data exchange can be carried out by wireless communication.

Figure 2:
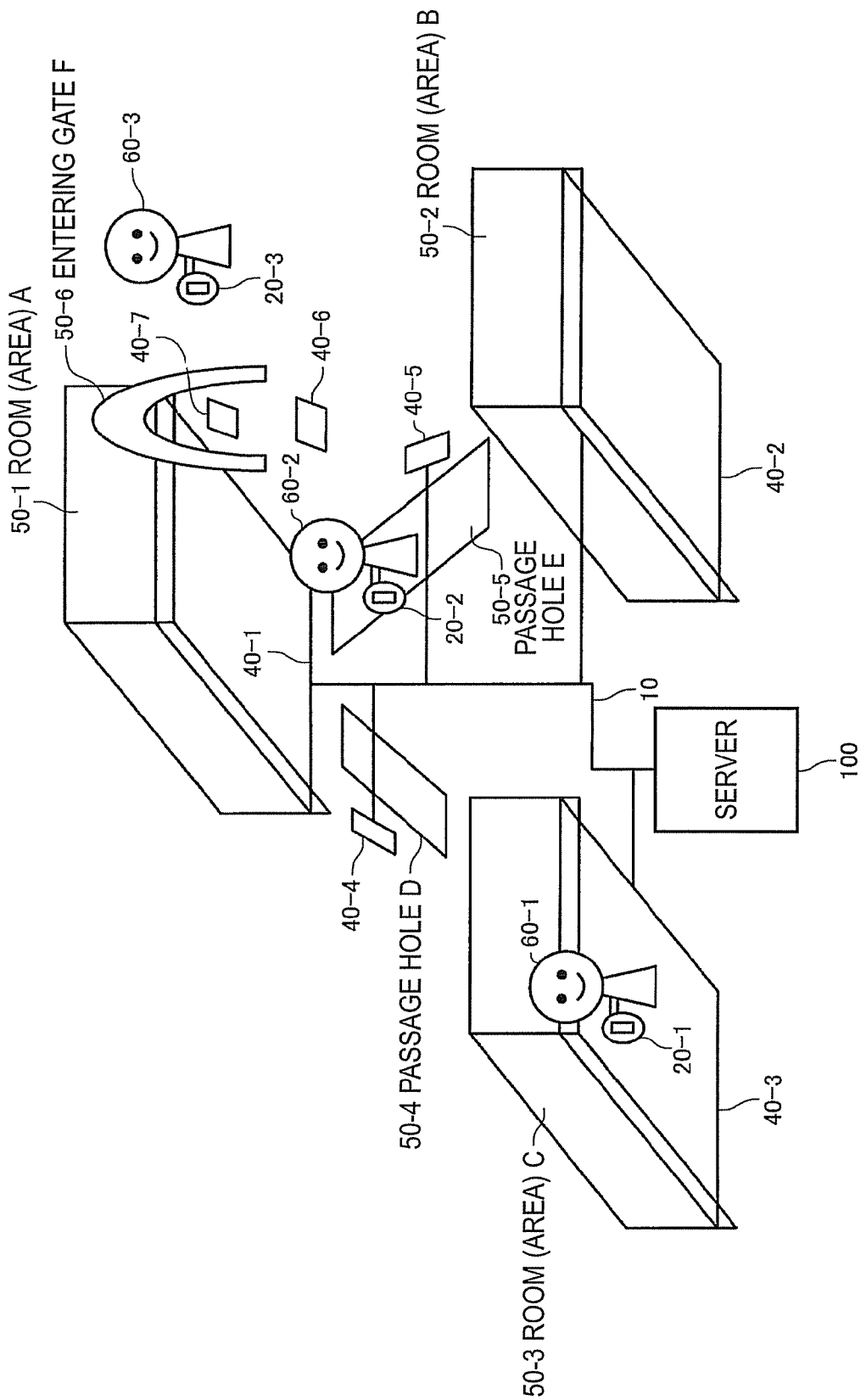
FIG. 2 is a diagram showing an application example of the communication system according to the embodiment.

FIG. 2 is a diagram showing an application example of the communication system according to the embodiment.

For example, users 60-1, 60-2, and 60-3 respectively carry mobile communication terminals 20-1, 20-2, and 20-3 in a facility such as an arcade and a theme park.

In the facility, relay devices 40-1, 40-2, 40-3, 40-4, 40-5, 40-6, and 40-7 are respectively placed in areas 50-1, 50-2, and 50-3, passage holes 50-4, and 50-5, both sides of an entering and leaving gate 50-6 for carrying out position management and entry/exit management.

The respective relay devices 40-1, 40-2, 40-3, 40-4, 40-5, 40-6, and 40-7 are coupled with the server device 100 through the network 10. The relay devices 40-1 to 40-7 receive information that is transmitted from the server device to transmit to each of the mobile communication terminals and receive information that is transmitted from the mobile communication terminals to transmit to the server device.

For example, in order to detect whether the user is in the area A 50-1 that is a predetermined region, a large loop antenna (10 meters square) that covers the area A may be placed as the relay device 40-1. Thus, the mobile communication terminals that are within the area A 50-1 can communicate with the relay device 40-1. If the mobile communication terminals that can communicate with the relay terminal 40-1 are detected, the mobile communication terminals that are in the area A 50-1 can be detected, for example.

Further, in order to detect the passing of the terminals near a predetermined point in the passage hole D 50-4, a small loop antenna (a coil having more than dozen centimeters length, for example) may be placed as the relay device 40-4, for example. Thus, the mobile communication terminals that are near the predetermined point of the passage hole D 50-4 can communicate with the relay device 40-4. If the mobile communication terminals that can communicate with the relay device 40-4 are detected, the mobile communication terminals that pass the predetermined point of the passage hole D 50-4 can be detected, for example.

Further, in order to carry out the entry/exit management of the entering and leaving gate F 50-6, small loop antennas may be placed as the relay devices 40-6 and 40-7 at the both sides of the gate. Thus, the mobile communication terminals that are at the sides of the entering and leaving gate F 50-6 can communicate with the relay devices 40-6 and 40-7. If the mobile communication terminals that can communicate with the relay devices 40-6 and 40-7 are detected, the mobile communication terminals that pass the entering and leaving gate F 50-6 can be detected, for example.

The mobile communication terminals 20-1, 20-2, and 20-3 may broadcast communication data including terminal IDs thereof by a predetermined interval. Thus, the relay device in a region where the relay device can communicate with the mobile communication terminals 20-1, 20-2, and 20-3 can receive the communication data.

Then if the communication data is transmitted to the server device 100, the server device 100 checks which relay device receives the communication data from the mobile communication terminals and transmits the data to the server device so as to determine positions of the mobile communication terminals. Then a position information update process of the mobile communication terminals may be carried out depending on the determination result.

In terms of determining which relay device receives the communication data of the mobile communication terminals and transmits it, when the relay device transmits the communication data received from the mobile communication terminals to the server device, the relay device may append its discrimination ID on the data. Thus the determination can be carried out depending on the appended discrimination ID of the relay device.

Either, the mobile communication terminals 20-1, 20-2, and 20-3 may enter a reception mode by a predetermined interval so as to check whether any information is transmitted for them and transmit information of their presence to the relay devices around them. The mobile communication terminals repeat such operation, being able to communicate with the relay devices 40-1, 40-2, 40-3, 40-4, 40-5, 40-6, and 40-7 that are within a communication available range. Thus the mobile communication terminals can communicate with the server device 100 through the relay devices 40-1, 40-2, 40-3, 40-4, 40-5, 40-6, and 40-7 that are in the communication available range.

Either, the relay devices 40-1, 40-2, 40-3, 40-4, 40-5, 40-6, and 40-7 may carry out a calling transmission so as to check whether there are any terminals present around them by a predetermined timing. After the calling transmission, the relay devices 40-1 to 40-7 enter a reception mode for a predetermined period so as to carry out a calling process for receiving responses with respect to the calling transmission. If the mobile communication terminals receive the calling transmission, they may carry out a transmitting process for the response.

The calling transmission may be carried out by a predetermined interval or may be carried out when a predetermined event occurs (in a case where there is information to be transmitted or a case where the relay devices receive transmission data, for example).

In terms of the calling transmission, a calling data packet may be transmitted in unicast while designating a transmission terminal ID, may be transmitted in multicast while designating a transmission group ID, or may be transmitted in broadcast while designating broadcast IDs of all terminals.

The relay devices carry out the calling transmission by a predetermined interval and transmit the response data with respect to the calling transmission to the server device, so that the server device can check current positions of the mobile communication terminals by a predetermined interval.

The server device 100 may select the relay devices based on the information on the positions of the mobile communication terminals so as to transmit the communication data to the concerned mobile communication terminals through the selected relay devices. For example, information on a position of the mobile communication terminal shows that the user 60-1 is in the area C (50-3). Under this case, in order to transmit data to the user 60-1, the server device 100 may select the relay device 40-3 corresponding to the area C (50-3) to transmit the communication data to the concerned mobile communication terminal through the relay device 40-3.

Accordingly, the server device 100 transmits the communication data for the concerned mobile communication terminal only to the selected relay device, so that the communication can be carried out efficiently.

In a case where the noncontact IC card is used as the wireless transmitter 30, the relay devices 40-1, . . . , 40-$n$ can be noncontact data reading devices. In this case, the relay devices 40-1, . . . , 40-$n$ that are the noncontact data reading devices read user discrimination information that is stored in the noncontact IC card. Thus, the relay devices 40-1, . . . , 40-$n$ that are the noncontact data reading devices may be placed in areas and gate so as to recognize current positions of the users depending on which area's relay device reads the data.

2. Structure of Mobile Communication Terminal

Figure 3:
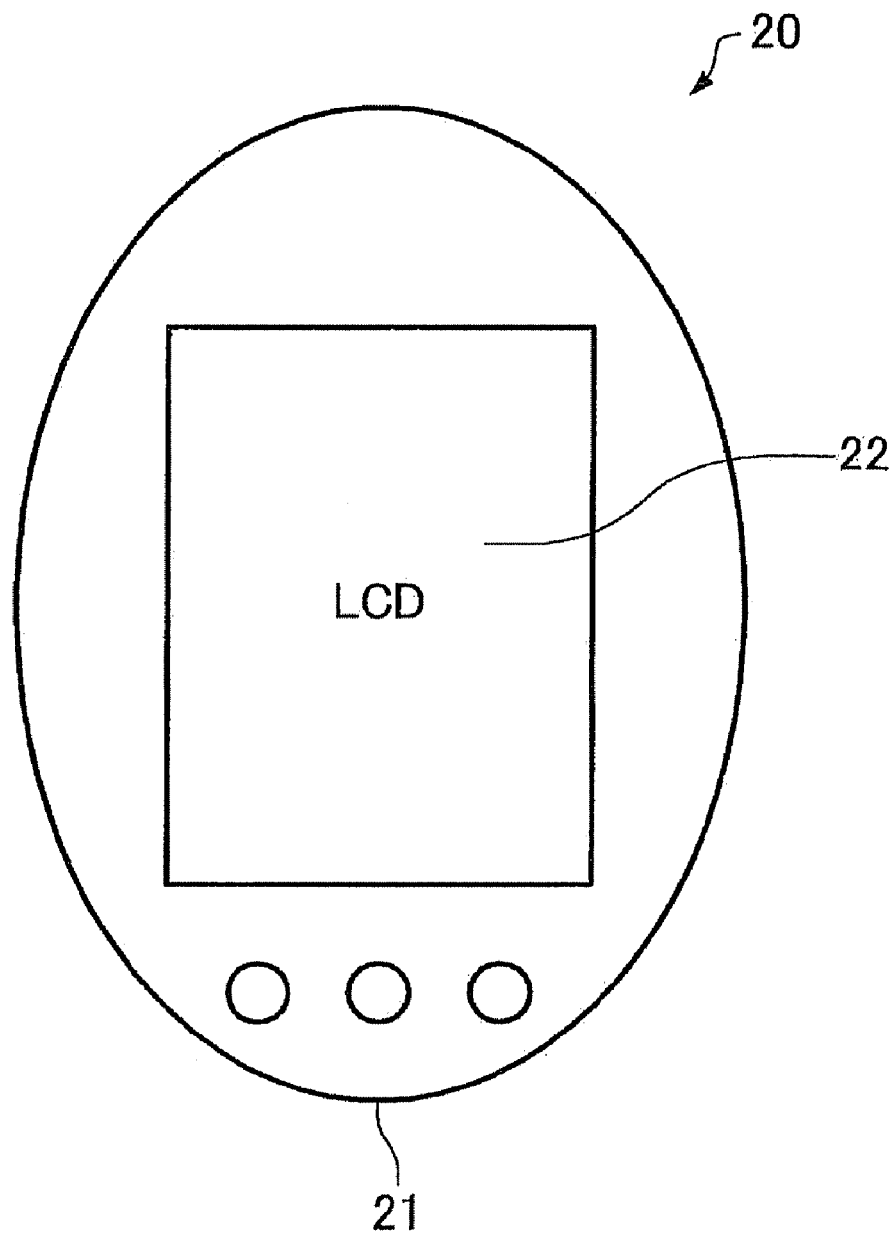
FIG. 3 is a diagram illustrating an exterior view of a mobile communication terminal.

FIG. 3 is a diagram illustrating an exterior view of a mobile communication terminal.

The mobile communication terminal 20 is a portable information terminal having a wireless communication function and includes a display part (information output unit) 21 such as an LCD and an operation part (information input unit) 22 such as a button.

Figure 4:
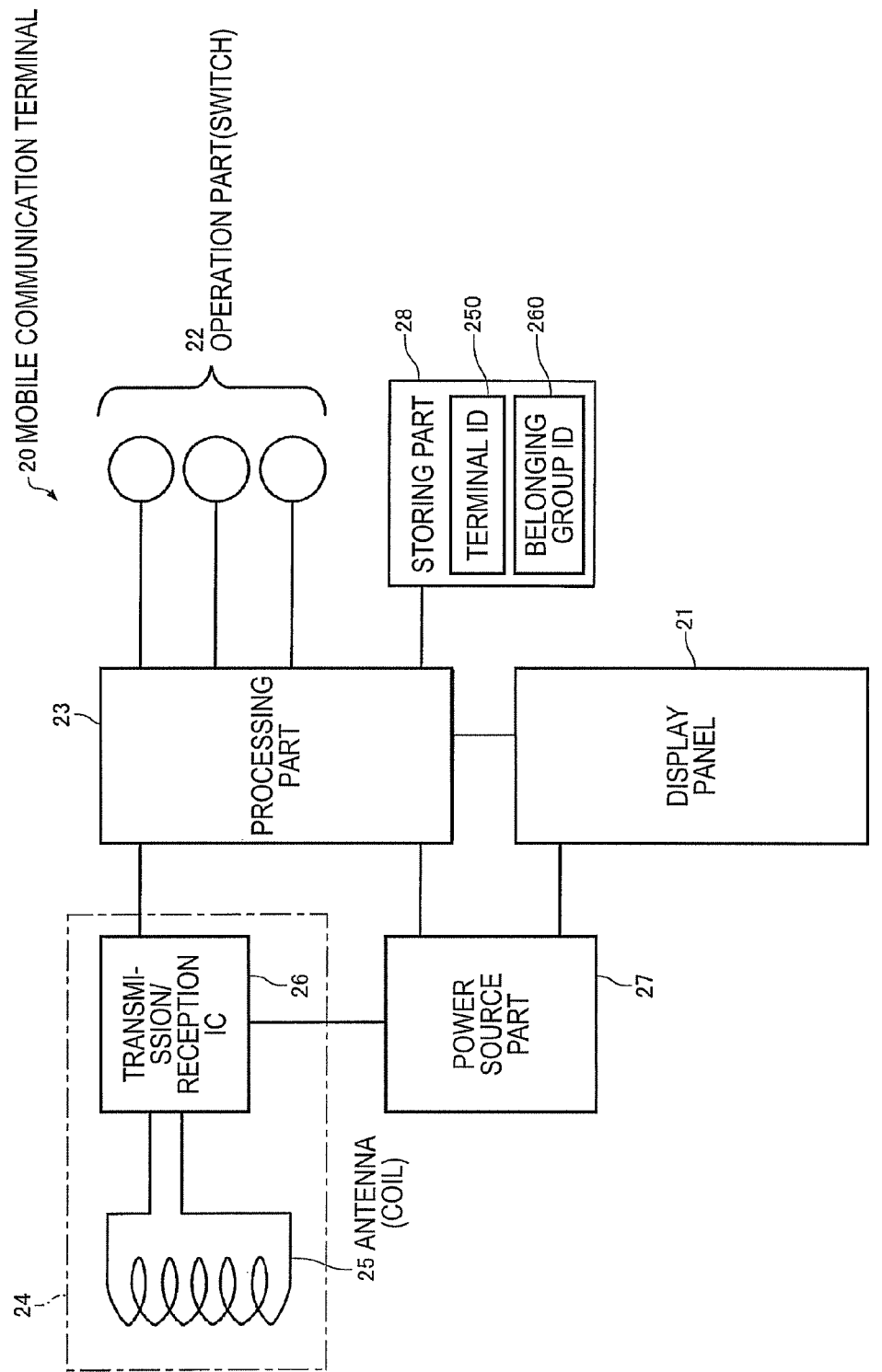
FIG. 4 is a structural diagram of the mobile communication terminal.

FIG. 4 is a structural diagram of the mobile communication terminal 20. The mobile communication terminal 20 includes a processing part 23, a communication part 24, a power source part 27, the operation part 22, and the display part (a display panel) 21.

The processing part (processor) 23 performs a driving control of the display part (LCD panel, for example) 21, a transmission/reception control, and other operations based on operation data from the operation part 22, data received by the communication part 24, and the like.

The processing part 23 functions as a processing unit for performing predetermined processes based on received information.

The processes of the processing unit of the mobile communication terminal includes: discriminating whether the received information is for an own device or not; transmitting an acknowledge with respect to the received information; allowing a storing part to store the received information for using, for example, as authentication data and for recording; downloading the received information; and outputting an image, a sound, and vibration based on the received information.

The processing part 23 determines whether the received communication data is for a belonging group of the own device or not based on belonging group information of the own device and information for specifying a predetermined group that is appended to the received communication data. In a case where the processing part 23 determines that the information is for the own belonging group, it may perform a predetermined process. In a case where it determines that the information is not for the own belonging group, it may discard the information.

If the processing part 23 receives a calling transmission, it may perform a transmission process for a response.

The communication part 24 performs various controls for communicating with the outside (the relay devices, in the embodiment). The function of the communication part 24 can be realized with devices which can perform the bidirectional short-range communication employing a long wave (a coil (loop antenna) 25 for receiving a long wave and a circuit (transmission/reception IC, for example) 26 for transmitting/receiving a long wave that is coupled to the coil, for example). The communication part 24 functions as a communication unit for wirelessly transmitting/receiving a long wave.

The power source part 27 can be realized with a battery or a battery power supply, for example.

The storing part 28 stores a program, data, and the like. The mobile communication terminal may be structured such that a flash memory (a flash EEPROM or a flash ROM) which is a rewritable nonvolatile memory is built in its main body, or such that a flash card or the like is coupled to the main body as an external memory.

The storing part 28 functions as a belonging group information storing unit that stores a unique terminal ID 250 for discriminating an own terminal. The storing part 28 may function as a belonging group information storing unit that stores also a belonging group ID 260 of which the group is a group of the concerned terminal belongs and the like.

The processing part 23 determines whether the received communication data is for a belonging group of the own device or not based on belonging group information of the own device and information for specifying a predetermined group that is appended to the received communication data. In a case where the processing part 23 determines that the information is for the own belonging group, it may perform a predetermined process.

The operation part 22 inputs an operation and the like of a user as data and the function thereof can be realized by hardware such as a button.

The display part 21 outputs an image produced by the present embodiment. The function of the display part 21 can be realized by hardware such as a liquid crystal display (LCD), an organic EL display (OELD), a plasma display panel (PDP), and a display with a touch panel.

Figure 5:
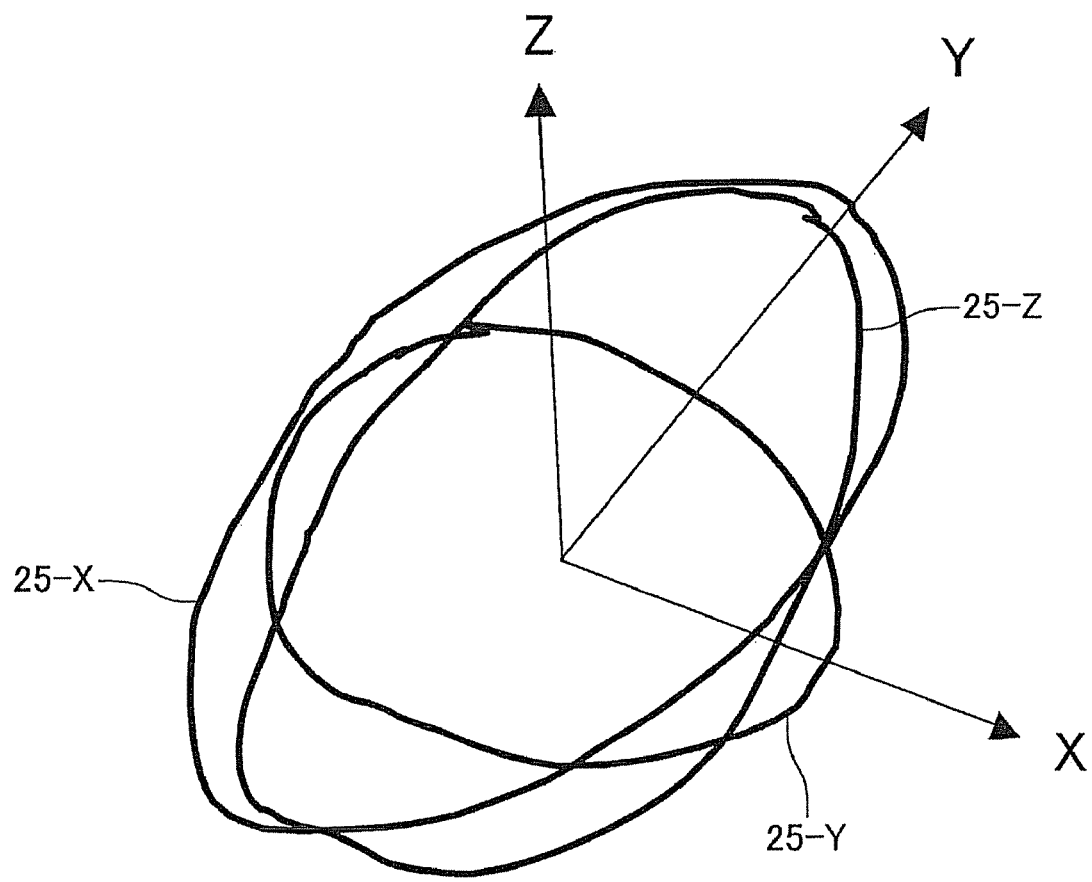
FIG. 5 is a diagram illustrating a coil within the mobile communication terminal.

FIG. 5 is a diagram illustrating a coil within the mobile communication terminal.

As shown in the figure, three coils 25-X, 25-Y, and 25-Z of which respective axis-directions are in three axes (X-axis, Y-axis, and Z-axis) perpendicular to each other may be built in the mobile communication terminal as antennas for receiving a long wave.

The communication unit of the mobile communication terminal and the first communication unit of the relay device may perform the transmission/reception by electromagnetic induction of a long wave in this embodiment. With this structure, even if the user holds the mobile communication terminal in any direction (even if the positional relation between the long wave and the mobile communication terminal is changed), at least one of the antennas is kept to be receivable. Therefore, the mobile communication terminal having high reception sensitivity can be obtained.

3. Structure of Server Device

Figure 6:
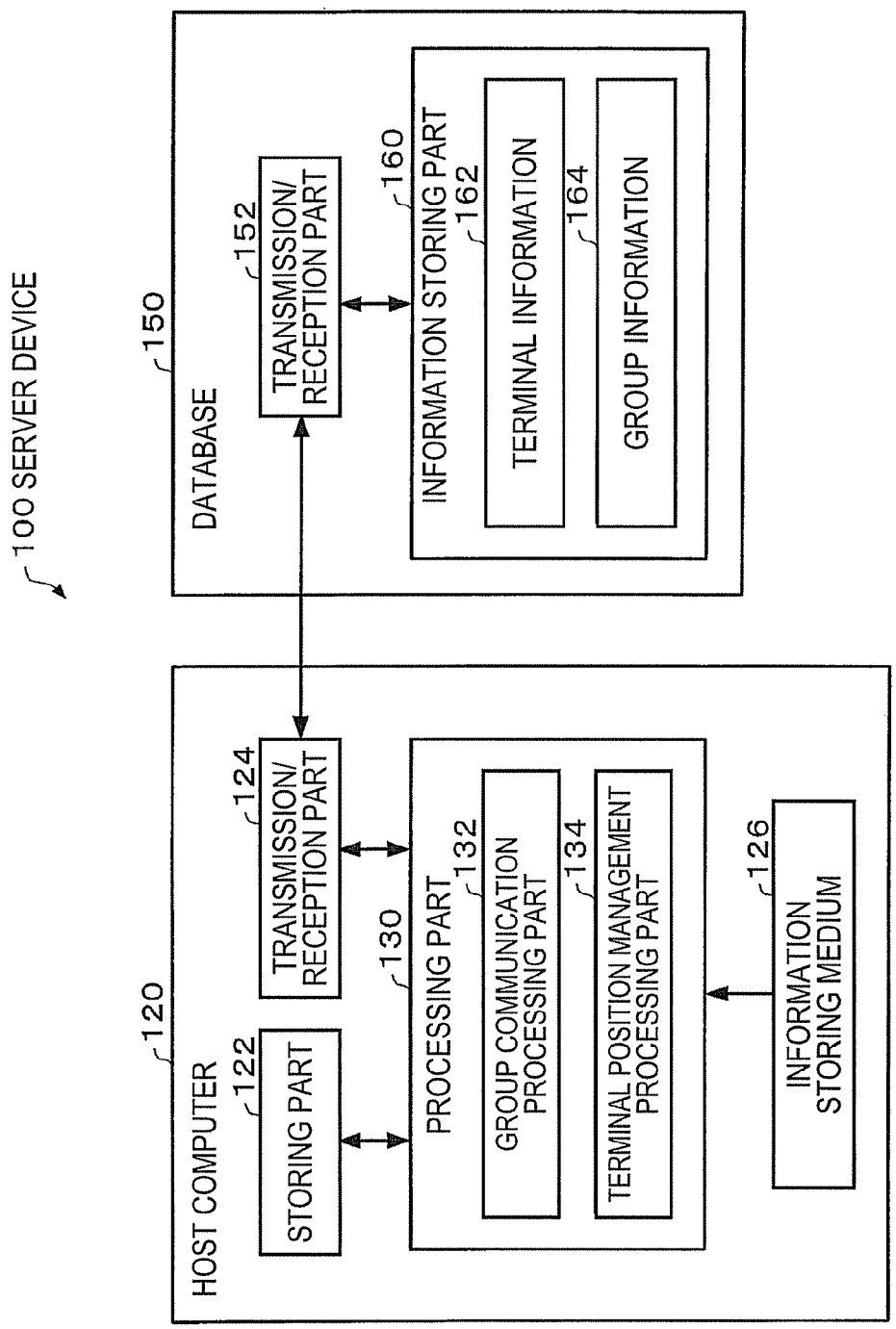
FIG. 6 is a functional block diagram showing an example of a server device.

FIG. 6 is a structural block diagram of an example of the server device 100 in the communication system according to the embodiment. Functions of the server device 100 described here may be provided in a separate manner physically to a plurality of computers to be operated.

The server device 100 in the communication system includes a host computer 120 and a database 150.

The host computer 120 includes a processing part 130, a storing part 122, an information storage media 126, and a transmission/reception part 124.

The transmission/reception part 124 exchanges data with the relay terminal 40-1, . . . , 40-$n$ and the database 150. The transmission/reception part 124 includes both of a transmitting function and a receiving function, but the transmitting and receiving functions may be separately realized in a transmitting unit and a receiving unit.

The storing part 122 is to be a work region of the processing part 130, the transmission/reception part 124, and the like. The storing part 122 can be realized with a RAM, for example.

The processing part 130 discriminates which terminal has transmitted a processing request and what kind of process is required based on the processing request that is received so as to perform various processes. The function of the processing part 130 can be realized with a combination of hardware (a processor such as a CPU and a DSP or an ASIC such as a gate array) and a program (a game program, firmware, or the like). Here, all of the functions of the processing part 130 may be realized with hardware or with a program.

The processing part 130 includes a group communication processing part 132 and a terminal position management processing part 134.

The group communication processing part 132 performs a group communication process in which mobile communication terminals belonging to a predetermined group are extracted based on group information so as to transmit the predetermined information to the mobile communication terminals that are extracted.

The group communication processing part 132 may perform a process for transmitting communication data that is to be transmitted to a plurality of the mobile communication terminals belonging to the predetermined group in broadcast or in multicast together with information for specifying the predetermined group.

The terminal position management processing part 134 may check which relay device receives the communication data from the mobile communication terminals and transmits it to the server device so as to determine the positions of the mobile communication terminals and perform a position information updating process of the mobile communication terminals based on the determination result.

Further, the terminal position management processing part 134 may determine whether the information on the positions of the mobile communication terminals satisfies a predetermined condition. In a case where the information satisfies the predetermined condition, the terminal position management processing part 134 may transmit notifying information to at least one of the present mobile communication terminal and other terminals belonging to the group to which the present mobile communication terminal belongs.

The terminal position check processing part 134 may select the relay device for the communication data to be transmitted to the present mobile communication terminals based on the information on the positions of the present mobile communication terminal so as to transmit the communication data to the present mobile communication terminal via the selected relay device.

The terminal position management processing part 134 may check which relay terminal receives the communication data from the present mobile communication terminal and transmits it to the server device so as to determine an area where the mobile communication terminals are present and perform a position information updating process of the information on the presenting area of the mobile communication terminals based on the determination result.

The information storing medium (storing medium applicable for a computer) 126 stores information such as a program and data. The function of the medium 126 can be realized with hardware such as an optical disk (CD or DVD), a magnet optical disk (MO), a magnetic disk, a hard disk, a magnetic tape, and a memory (ROM).

The processing part 130 performs various processes according to the embodiment based on information stored in the information storing medium 126. The information storing medium 126 stores information (a program or data) for performing a means (a block included to the processing part 130, especially) of the embodiment.

Here, other functions mentioned above can be realized by reading information from the information storing medium 126, as well.

Part or whole of the program and the data stored in the information storing medium 126 may be received through a transmission medium such as a network line. Namely, the host computer 120 can receive a program and data that are converted into a carrier wave, from a predetermined host terminal device through a network, for example, so as to realize various functions mentioned above.

The database 150 includes a transmission/reception part 152 performing transmission/reception with respect to the host computer 120 and an information storing part 160 storing terminal information 162 and group information 164 in an available manner.

The information storing part 160 is a storing medium readable with a CPU such as magnetical and optical recording mediums and a semiconductor memory. The information storing part 160 can be realized with an RAM, a hard disk (magnetic disk), a flexible disk, a CD-ROM, and the like.

Figure 7A:
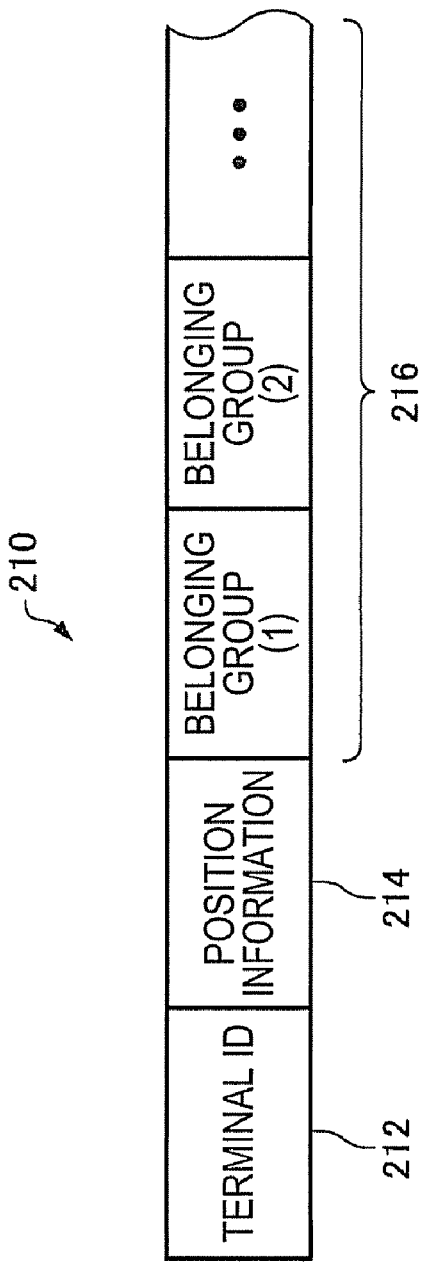
FIGS. 7A and 7B are figures for explaining components of terminal information and group information.
Figure 7B:
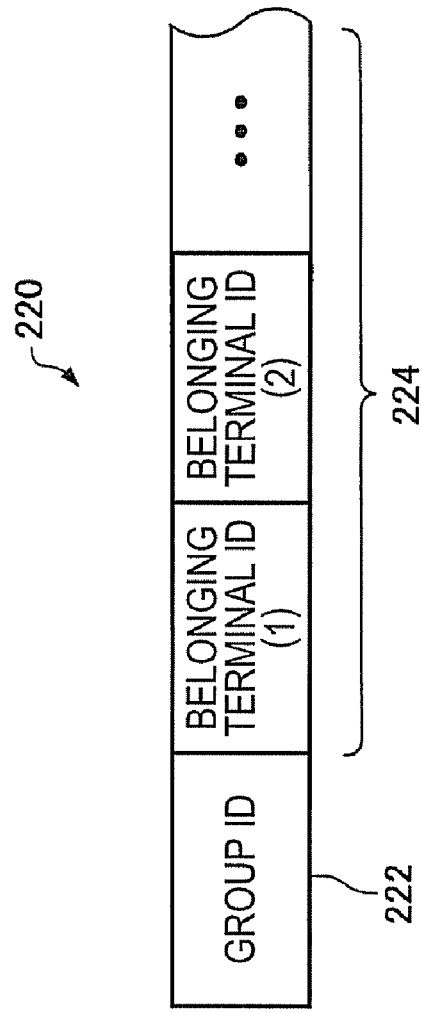

FIGS. 7A and 7B are diagrams for explaining components of terminal information and group information.

As shown in FIG. 7A, each mobile communication terminal has a terminal information record 210 as the terminal information. The terminal information record 210 includes a terminal ID 212, position information 214, and belonging group 216. Any information with which the terminal can be discriminated may be the terminal ID 212. An ID or an IP address uniquely given to the mobile communication terminal, for example, may be the terminal ID 212. Any information that is related to the position of the mobile communication terminal can be the position information 214. A discrimination ID of the relay device used in the latest communication, and information with which an area or a point corresponding to the relay device used in the latest communication is specified may be the position information 214. Further, information on whether the mobile communication terminal passes a predetermined gate or not may be maintained as information in terms of the position of the mobile communication terminal. In a case where one terminal belongs to a plurality of groups, there are a plurality of belonging group information.

Each group may have a group information record 220 as shown in FIG. 7B. The group information record 220 includes a group ID 222 and a belonging terminal ID 224. The belonging terminal ID 224 is a terminal ID of the mobile communication terminal belonging to the concerned group.

4. Relay Device

Figure 8:
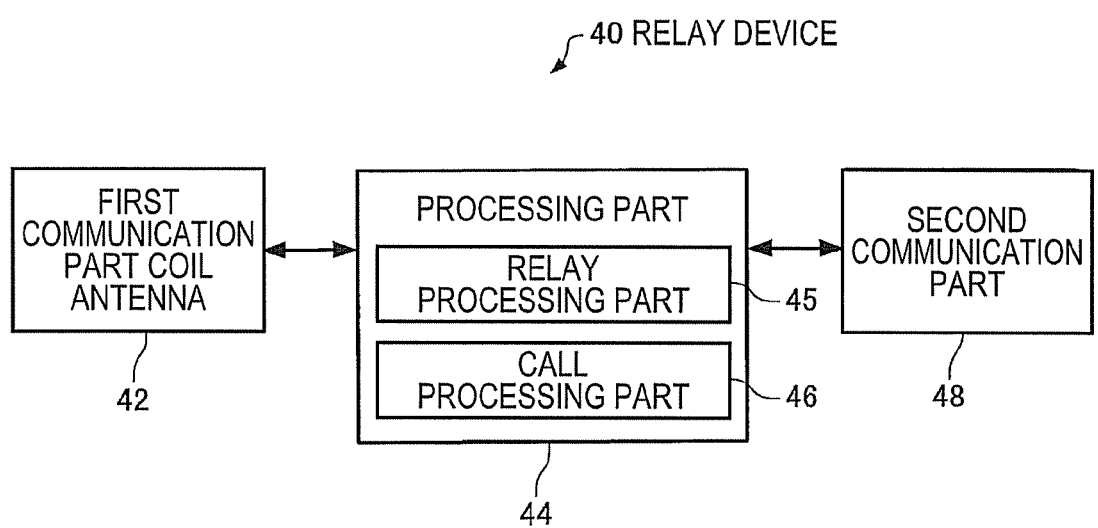
FIG. 8 is a diagram for explaining a relay device.

FIG. 8 is a diagram for explaining a relay device.

This relay device 40 includes a first communication part 42, a processing part 44, and a second communication part 48.

The first communication part 42 includes an antenna for transmitting and receiving a long wave that is disposed at a predetermined area or doorway of a gate, a circuit for transmitting and receiving a long wave (transmission/reception IC, for example), and the like. The first communication part 42 functions as a first communication unit transmitting and receiving a long wave wirelessly with respect to the mobile communication terminals.

The second communication part 46 performs various controls for communicating with the server device (with wires or without wires). The function of the second communication part 48 can be realized with various processors, or hardware such as a communication ASIC, and a program.

The processing part 44 performs various processes such as a relay of communication. The processing part 44 can be realized with a processor such as a CPU, an ASIC such as a gate array, a communication IC, hardware such as a router, or a combination of the hardware and a program (firmware, for example).

The processing part 44 includes a relay processing part 45. The relay processing part 45 performs a relay process for transmitting information received from the server device via the second communication part 48 to the mobile communication terminals via the first communication part 42, and a relay process for transmitting information received from the mobile communication terminals via the first communication part 42 to the server device via the second communication part 48.

The processing part 44 includes a call processing part 46. The call processing part 46 performs a call transmission for confirming presence of the terminals therearound by predetermined timing and enters a reception mode for a predetermined period after the call transmission so as to receive a response with respect to the call.

5. Group Communication Process

Figure 9:
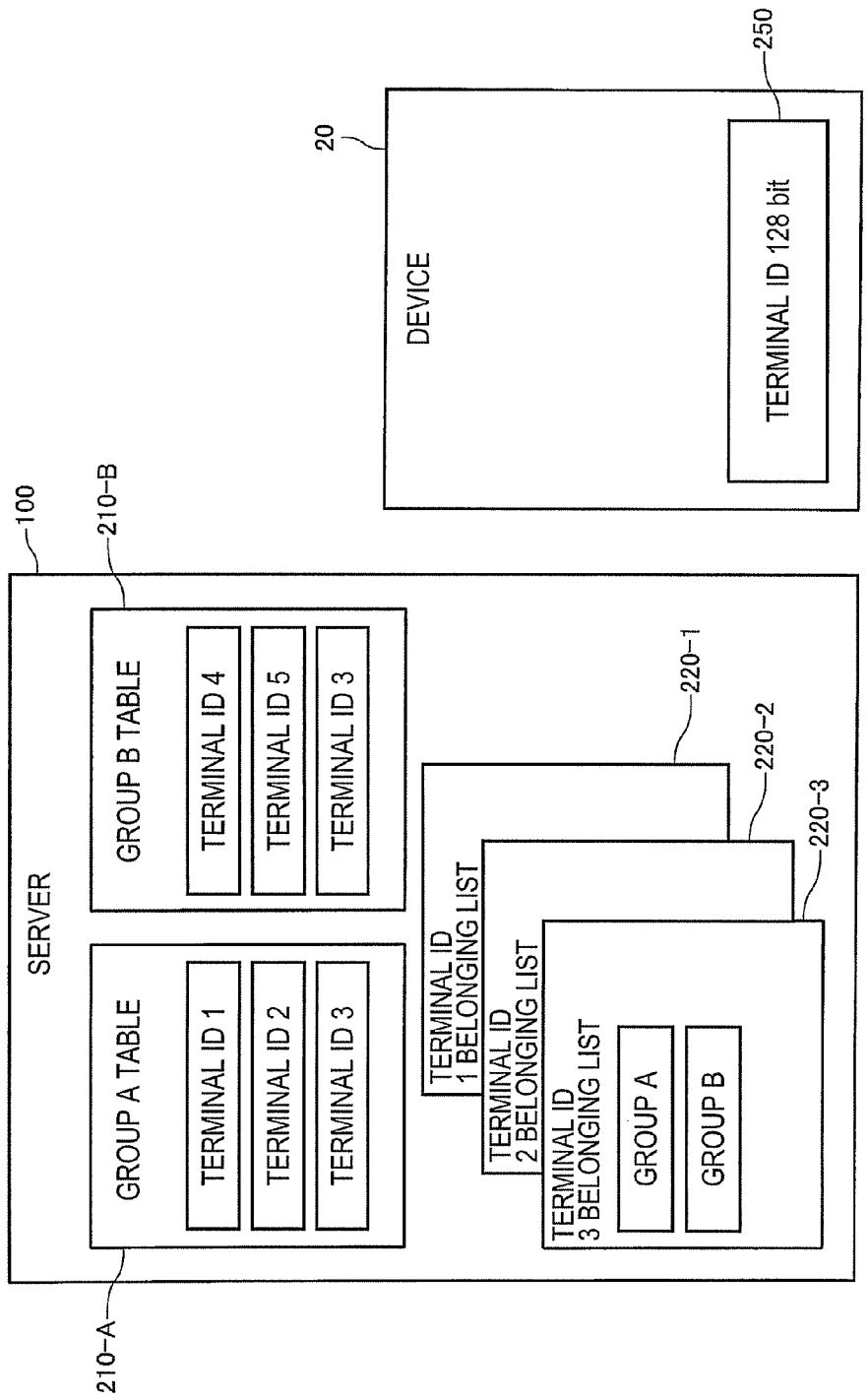
FIG. 9 is a diagram for explaining an example of a group management and a group communication process of the server device.

FIG. 9 is a diagram for explaining an example of a group management and a group communication process of the server device.

The server device 100 stores a group A table 210-A and a group B table 210-B as group information. Each group table may maintain discrimination information, for example, of the mobile communication terminals belonging to the groups.

In the embodiment, the mobile communication terminals belonging to a group A have a "terminal ID 1", a "terminal ID 2", and a "terminal ID 3", so that the group A table 210-A maintains the terminal ID 1, the terminal ID 2, and the terminal ID 3 that are discrimination information of the mobile communication terminals belonging to the group A.

The mobile communication terminals belonging to a group B have a "terminal ID 4", a "terminal ID 5", and a "terminal ID 3", so that the group B table 210-B maintains the terminal ID 4, the terminal ID 5, and the terminal ID 3 that are discrimination information of the mobile communication terminals belonging to the group B. Here the terminal ID 3 belongs to both of the group A and the group B. One mobile communication terminal may belong to a plurality of groups.

The server device 100 may store belonging group tables of the mobile communication terminals as terminal information. The belonging group tables of each of the mobile communication terminals may store information (a group ID, for example) of a group to which each of the mobile communication terminals belongs, with respect to each of the mobile communication terminals.

In the embodiment, the terminal ID 3 belongs to the group A and the group B, so that a belonging group table 220-3 of the terminal ID 3 maintains a discrimination ID and the like of the group A and the group B.

The mobile communication terminal 20 stores its own terminal ID 250.

If an event in which predetermined information is transmitted to all of the terminals belonging to the group A, the server device may read out the terminal IDs belonging to the group A from the group A table so as to produce transmitting data of which the destination is the terminal ID of each of the terminals belonging to the group A. Thus the server device may transmit the data in unicast via the relay device. For example, since the terminal ID 1, the terminal ID 2, and the terminal ID 3 belong to the group A, data may be transmitted to each of the three terminals as destinations in unicast.

Then in a case where the destination of the received data is the terminal ID of the own device, the mobile communication terminal may process the data, and in a case where the destination of the received data is not the terminal ID of the own device, the mobile communication terminal may discard the data.

Figure 10:
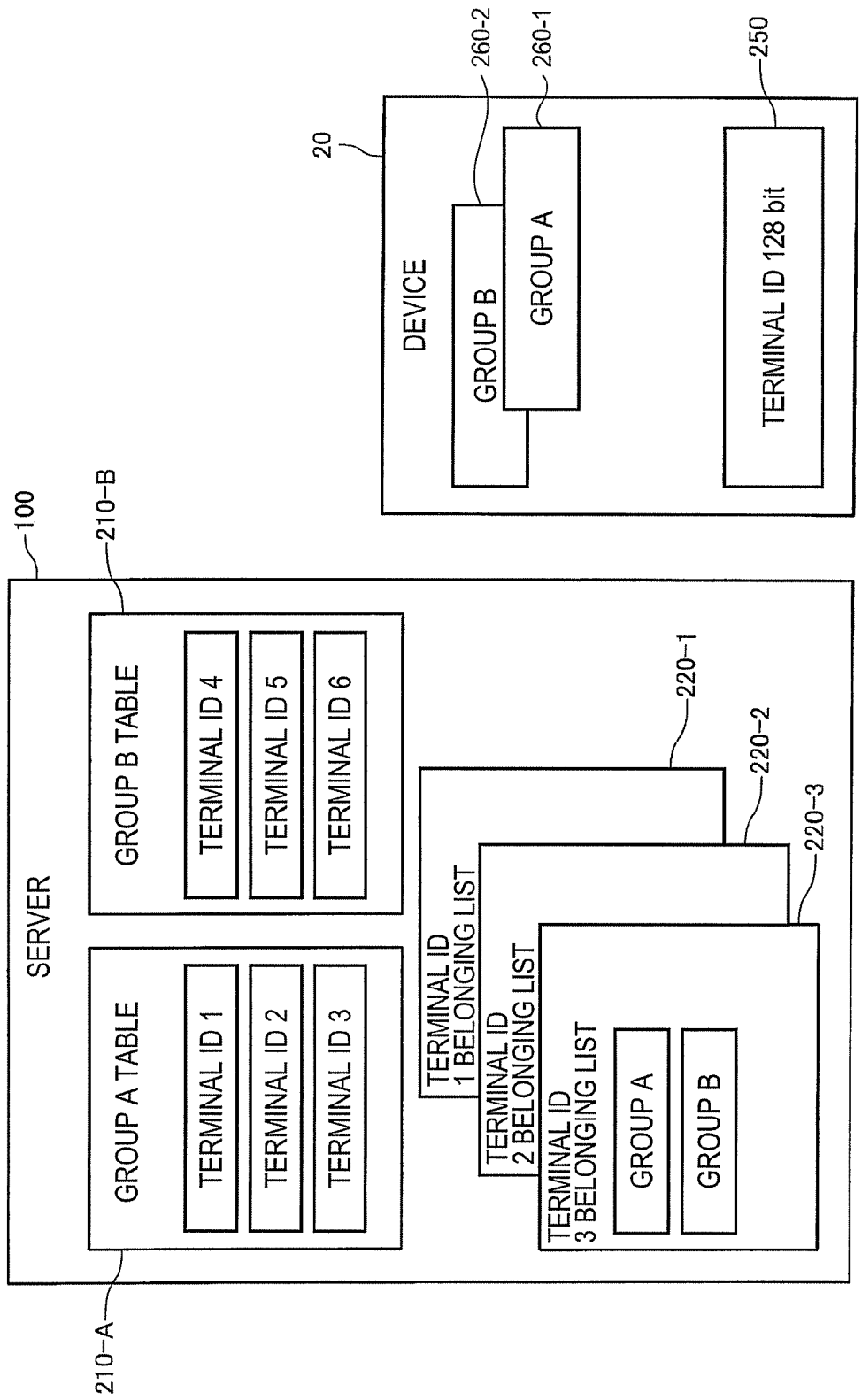
FIG. 10 is a diagram for explaining another example of the group management and the group transmission process of the server device.

FIG. 10 is a diagram for explaining another example of a group management and a group transmission process of the server device.

The group information stored in the server device 100 is the same as that in FIG. 9, so that the description will be omitted.

On the other hand, the mobile communication terminal 20 stores a belonging group information 260 that is information of a group to which the present terminal 20 belongs as well as its own terminal ID 250. For example, the mobile communication terminal 20 having the terminal ID 3 belongs to the group A and the group B, so that the terminal 20 stores group IDs of the group A and the group B as the belonging group information.

If an event in which predetermined information is transmitted to all of the terminals belonging to the group A, the server device may produce transmitting data to which the group specifying information (the group ID of the group A, for example) showing that the transmitting data is for the group A is appended so as to transmit the data in broadcast or in multicast.

The mobile communication terminal may process the data in a case where the data is for the own belonging group, and may discard the data in a case where the data is not for the own belonging group, based on the group specifying information of the received data and the group information that the present terminal maintains.

If the communication data is transmitted in broadcast or in multicast as above, the communication data can be transmitted to all mobile communication terminals belonging to a group by one communication. Therefore, the communication can be performed efficiently in a short period of time compared to a case where the data is individually transmitted to all the terminals belonging to the group in unicast, for example. Especially in the embodiment, since the communication is performed with a long wave between the relay device and the mobile communication terminal, it takes long period of time to transmit the data individually in unicast. However, the transmission of the data in broadcast or in multicast can reduce the communication time substantially.

6. Passage Detecting Process

Figure 11:
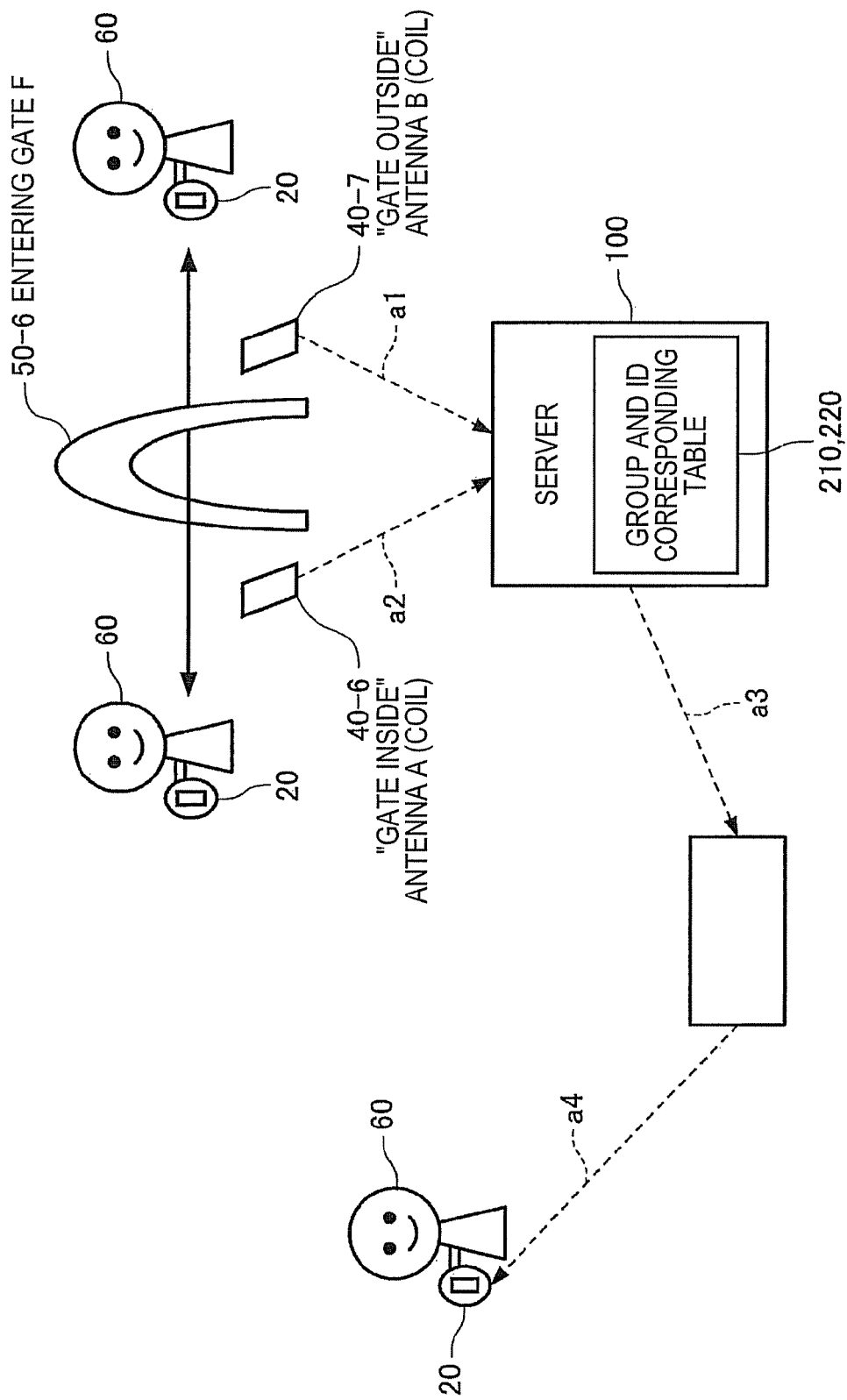
FIG. 11 is a diagram for explaining a passage detecting process according to the embodiment.

FIG. 11 is a diagram for explaining a passage detecting process according to the embodiment.

At both sides of the entering and leaving gate 50-6, a relay device ("gate inside" antenna A (a coil)) 40-6 and a relay device ("gate outside" antenna B (a coil)) 40-7 are placed.

In a case where the user 60 carrying the mobile communication terminal 20 passes from the outside of the entering and leaving gate 50-6 to the inside of the gate 50-6, the relay device 40-7 receives transmitting information (including the terminal ID) from the mobile communication terminal. Then the relay device 40-7 transmits the detecting information of the mobile communication terminal 20 to the server device 100 that is a terminal ID server (a1). The relay device 40-7 may transfer the received information as it is to the server device (In this case, a discrimination ID of the concerned relay device may be added as transmission source information.). Either, the relay device may produce detecting data including the terminal ID of the mobile communication terminal or the discrimination ID of the relay device based on the received information from the terminal so as to transmit the data to the server device.

If the server device 100 receives the detecting information from the relay device 40-7, the server device 100 performs an entering process with respect to the terminal ID in accordance with the detecting information. The server device 100 may update the position information (214 in FIG. 7A) of the terminal record of the concerned mobile communication terminal (write the ID of the relay device, for example). If necessary, the server device 100 may notify the position information of the concerned mobile communication terminal to a group to which the concerned mobile communication terminal belongs or to a mobile communication terminal that belongs to the same group as the concerned mobile communication terminal (a3, and a4).

Then if the relay device 40-6 receives transmitting information (including the terminal ID) from the mobile communication terminal 20, the relay device 40-6 transmits detecting information (including the terminal ID of the mobile communication terminal and the discrimination ID of the relay device) of the mobile communication terminal 20 to the server device 100 that is the terminal ID server (a2). The server device 100 may perform an entering process with respect to the terminal ID in accordance with the detecting information, in a case where the relay device 40-6 detects the same terminal ID after the relay device 40-7 detects the terminal ID.

The server device 100 may update the position information (214 in FIG. 7A) of a terminal record of the concerned mobile communication terminal (write the ID of the relay device, for example) as the entering process. If necessary, the server device 100 may notify the position information of the concerned mobile communication terminal to a group to which the concerned mobile communication terminal belongs or to a mobile communication terminal that belongs to the same group as the concerned mobile communication terminal (a3, and a4).

Further, if necessary, the server device 100 may be coupled with a billing management system so as to perform the billing management in a correlating manner to the entering process and the leaving process.

7. Entery Detecting Process to Specified Region

Figure 12:
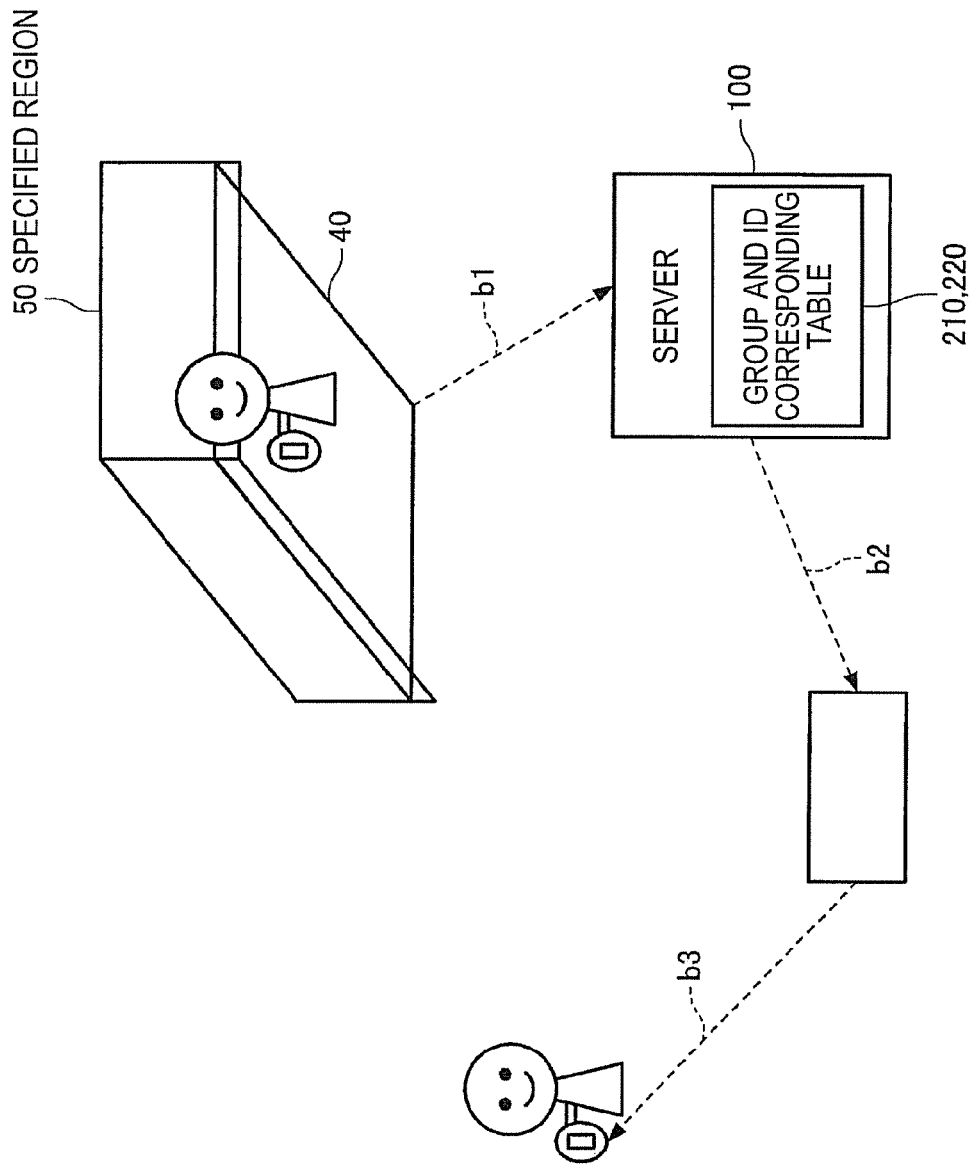
FIG. 12 is a diagram for explaining an entry detecting process to a specified region according to the embodiment.

FIG. 12 is a diagram for explaining an entery detecting process to a specified region according to the embodiment.

The relay device ("specified area antenna" (a coil)) 40 is placed at the circumference of a specified region (a predetermined area) 50.

If the relay device 40 receives transmitting information (including the terminal ID) from the mobile communication terminal 20, the relay device 40 transmits detecting information (including the terminal ID of the mobile communication terminal and the discrimination ID of the relay device) of the mobile communication terminal 20 to the server device 100 that is the terminal ID server (b1). The mobile communication terminal may transmit presence information of its own device to the periphery by a predetermined interval. Either, the relay device 40 may perform response requirement in broadcast with respect to terminals that are present around the concerned relay device, and the mobile communication terminals that enter the reception mode by a predetermined interval may respond to the response requirement so as to transmit information of its own presence.

The relay device 40 may transfer the received information as it is to the server device (In this case, a discrimination ID of the concerned relay device is added as transmission source information.). Either, the relay device 40 may produce detecting data including the terminal ID of the mobile communication terminal or the discrimination ID of the relay device 40 based on the received information from the terminal so as to transmit the data to the server device.

In a case where the server device 100 constantly receives the presence information of the same terminal ID from the relay device 40 at the circumference of the specified region, the server device 100 may determine as the concerned mobile communication terminal 20 is present at the specified region 50.

If the server device 100 receives the presence information of the terminal from the relay device 40, the server device 100 may perform an entering process to the specified region 50 with respect to the terminal ID in accordance with the presence information. The server device 100 may update the position information (214 in FIG. 7A) of a terminal record of the concerned mobile communication terminal (write the ID of the relay device, for example). If necessary, the server device 100 may notify the position information of the concerned mobile communication terminal to a group to which the concerned terminal belongs or to a mobile communication terminal that belongs to the same group as the concerned terminal.

In a case where the reception of the presence information of the concerned terminal ID from the relay device 40 is stopped or in a case where the server device 100 receives the presence information of the concerned terminal ID from other relay device, the server device 100 may determine as the concerned mobile communication terminal 20 leaves the specified region 50.

The server device 100 may update the position information (214 in FIG. 7A) of a terminal record of the concerned mobile communication terminal (write the ID of the relay device, for example) as the leaving process. If necessary, the sever device 100 may notify the position information of the concerned mobile communication terminal to a group to which the concerned mobile communication terminal belongs or to a mobile communication terminal that belongs to the same group as the concerned mobile communication terminal (b2, and b3).

Further, if necessary, the server device 100 may be coupled with a billing management system so as to perform the billing management in a correlating manner to the entering process and the leaving process.

8. Position Management Process for Each Terminal

Figure 13:
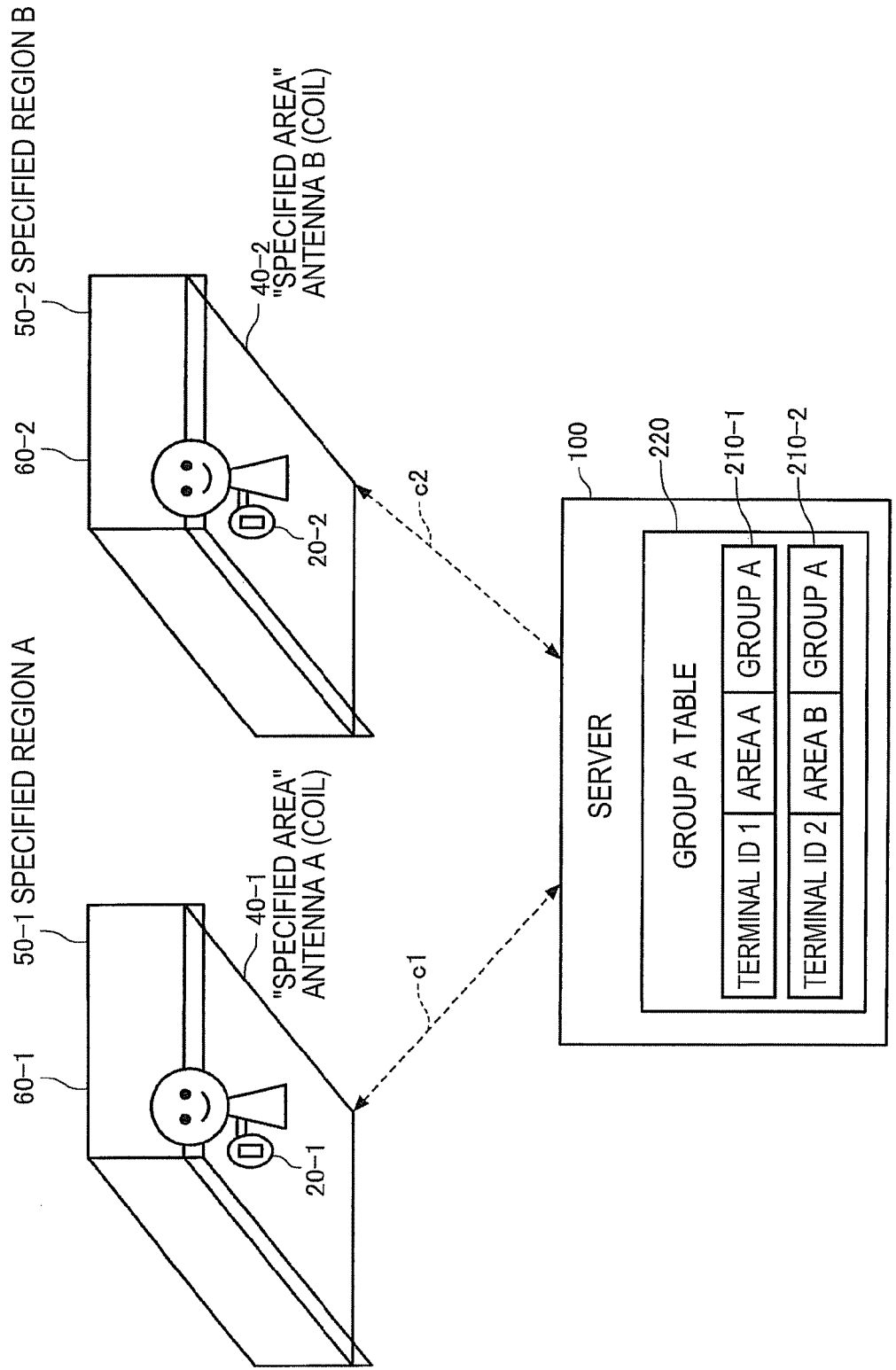
FIG. 13 is a diagram for explaining a position management process for each terminal.

FIG. 13 is a diagram for explaining a position management process for each terminal according to the embodiment.

The relay device (a "specified area antenna A" (a coil)) 40-1 and the relay device (a "specified area antenna B" (a coil)) 40-2 are placed at the circumference of each area (a specified region A 50-1, and a specified region B 50-2, for example).

The relay devices 40-1 and 40-2 respectively receive transmitting information (including the terminal ID) from the mobile communication terminals that are in corresponding regions (a specified region A 50-1, and a specified region B 50-2, for example). For example, in a case where the mobile communication terminal 20-1 is in the specified region A 50-1, the relay device 40-1 corresponding to the specified region A 50-1 receives information (including the terminal ID of the mobile communication terminal and the discrimination ID of the relay device) transmitted from the mobile communication terminal 20-1. For example, in a case where the mobile communication terminal 20-2 is in the specified region B 50-2, the relay device 40-2 corresponding to the specified region B 50-2 receives information (including the terminal ID of the mobile communication terminal and the discrimination ID of the relay device) transmitted from the mobile communication terminal 20-2.

The relay devices 40-1 and 40-2 respectively transmit the transmitting information received from the mobile communication terminals (c1, c2).

The server device may include a terminal information record 210 and a group table 220 for each mobile communication terminal.

In terms of a terminal information record 210-1 corresponding to the mobile communication terminal 20-1, the terminal ID is a "terminal ID 1", the position information is an "area A", and the belonging group is a "group A". In terms of a terminal information record 210-2 corresponding to the mobile communication terminal 20-2, the terminal ID is a "terminal ID 2", the position information is an "area B", and the belonging group is a "group A".

A group A table 220 is a group table for the group A. The table 220 shows that the terminal ID 1 and the terminal ID 2 belong to the group A.

Here, the position information may include an area discrimination ID corresponding to the relay device that detects the presence of the mobile communication terminal, or include a discrimination ID of the relay device that detects the presence of the mobile communication terminal.

In a case where one relay device for the transmitting information with respect to the same terminal is switched over to another relay device, the server device updates the position information of the terminal information record of the concerned terminal into position information of an area corresponding to the another relay device.

Every time the position information of each of the mobile communication terminals changes, the server device 100 may notify the position change (notify a new position) to the terminals belonging to the same group as the terminal of which the position is changed.

Further, in a case where an inquire event from one mobile communication terminal occurs, the server device 100 may notify the position information of terminals belonging to the same group as the terminal that is the inquiry source to the concerned terminal.

9. Communication Operation of System

Figure 14:
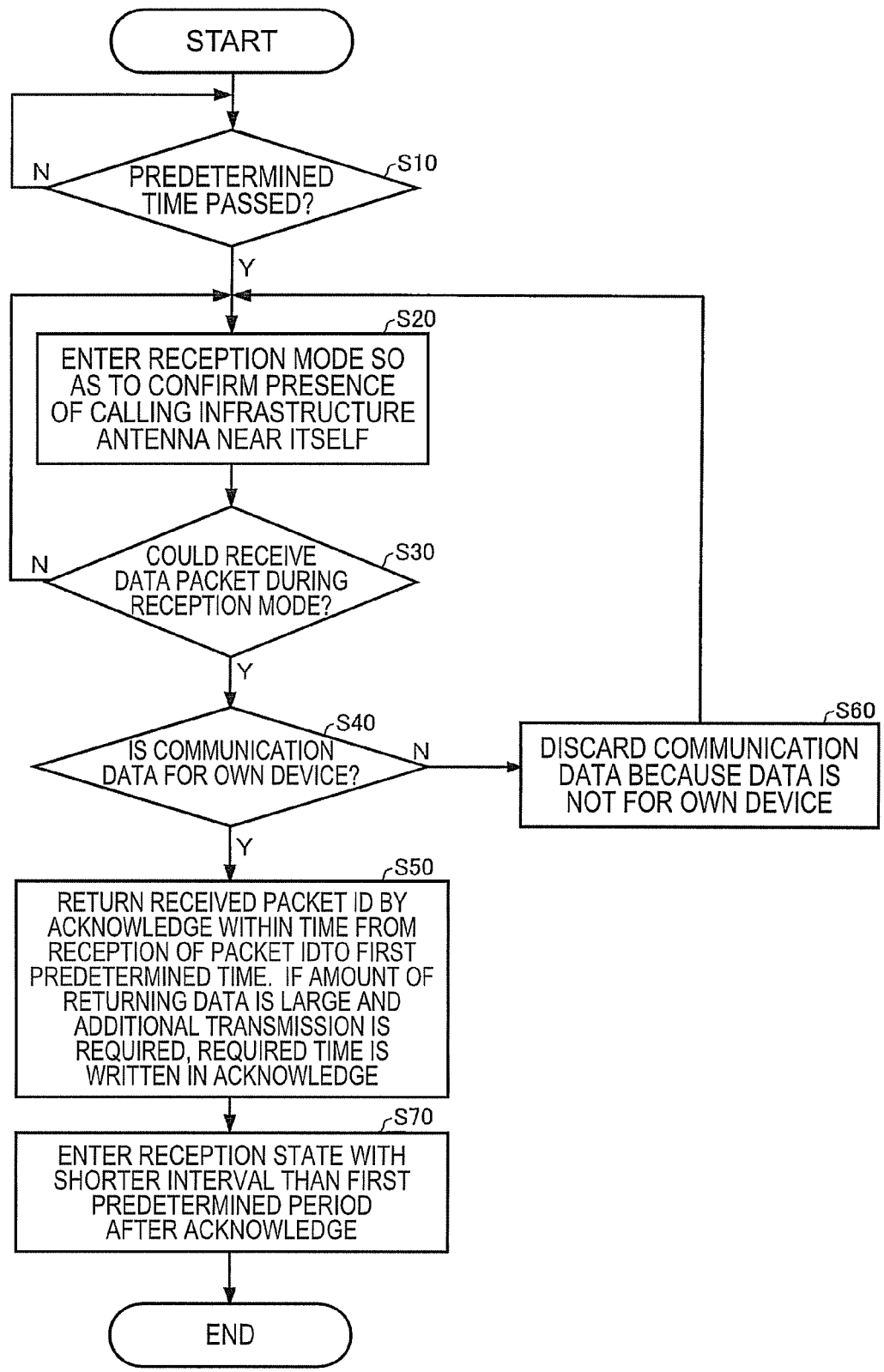
FIG. 14 is a diagram for explaining a communication operation of the mobile communication terminal.

FIG. 14 is a diagram for explaining a communication operation of the mobile communication terminal according to the embodiment.

In the embodiment, in order to realize a long continuous operation and a quick response, the mobile communication terminal may be allowed to perform an intermittence operation by the heuristic algorithm.

The mobile communication terminal usually enters the reception mode about once in a first predetermined period so as to confirm whether there is a calling infrastructure antenna near itself, so that a timer and the like therein is set to notify the switching into the reception mode by a predetermined interval depending on the situation. Thus, if the mobile communication terminal detects the passage of the predetermined time, the terminal enters the reception mode so as to confirm whether there is a calling infrastructure antenna near itself (step S10 and S20).

If the terminal receives a data packet during the reception mode, the terminal determines whether the communication data is for its own device or not (step S30 and S40).

In a case where the communication data is for the own device, the terminal returns an ID of the received packet by acknowledge within the time from the receiving of the packet ID to the first predetermined period. If an amount of the returning data is large and additional transmission is required, a required time is written in the acknowledge (step S50).

The case where the communication data is for the own device means a case where the communication data is broadcasted to all the terminals and a case where the terminal ID shown as a destination of the communication data transmitted in unicast matches the terminal ID of its own device, for example. In a system configured such that a mobile communication terminal maintains a group ID of a group to which the concerned terminal belongs, the case where the communication data is for the own device is a case where a group ID of a destination of the communication data, that is transmitted in multicast and its destination is set to be a group ID of a predetermined ID, matches the group ID of the group of the own device.

In a case where the communication data is not for the own device, the communication data is discarded and the process returns to the step S20 (step S60).

After the acknowledge, the mobile communication terminal enters the reception mode with the shorter interval than the first predetermined period (step S70).

If an amount of the returning data is large and additional transmission is required, required time is written in the acknowledge. After the acknowledge, the terminal enters the reception mode with a shorter interval than the first predetermined period so as to repeat the operations of the steps S30 to S70. While a packet for the own device continuously reaches, the interval may be made shorter. If a packet for the own device does not reach and a packet for other devices reaches, the interval may be made longer.

Figure 15:
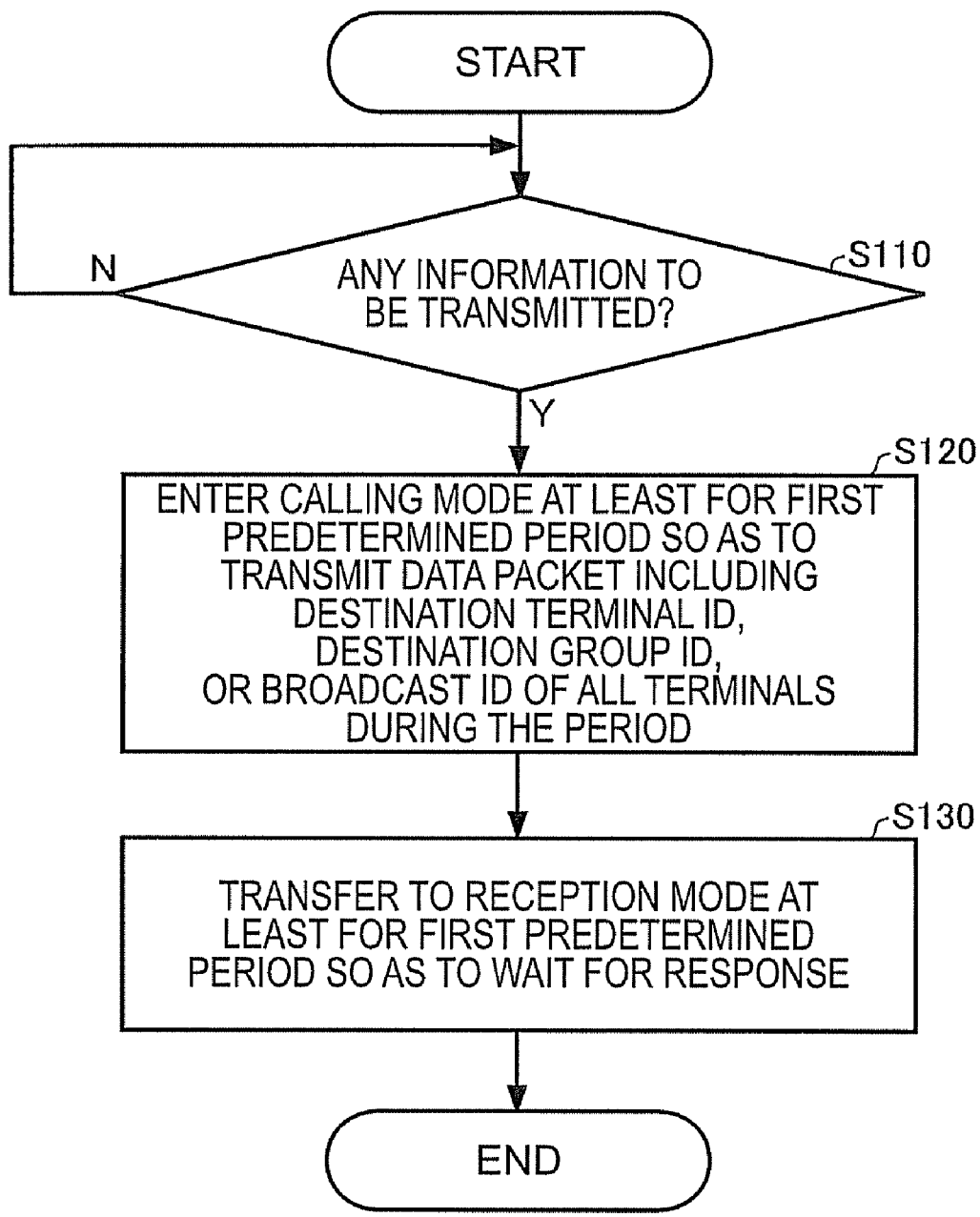
FIG. 15 is a diagram for explaining a communication operation of the relay device.

FIG. 15 is a diagram for explaining a communication operation of the relay device according to the embodiment.

In a case where there is information to be transmitted by the relay device, the relay device enters the calling mode at least for a first predetermined period so as to transmit a data packet including the destination terminal ID, the destination group ID, or the broadcast ID of all terminals during the period (step S110 and S120).

The case where there is information to be transmitted by the relay device is a case where the relay device receives the communication data for the terminal from the server device, for example. In a case where the relay device autonomously transfers to the calling mode with respect to the terminal or transfers to the reception mode in which the relay device receives the communication from the terminal by a predetermined interval, the information may be transmitted in the transferring time to the calling mode.

Then the relay device transfers to the reception mode at least for the first predetermined period so as to wait for a response (step S130).

Here, since the mobile communication terminal performs the process shown in FIG. 11 in a case where the mobile communication terminal is present at an area where it can communicate with the relay device, the relay device waits so as to receive the communication data from the mobile communication terminal during the reception mode.

Figure 16:
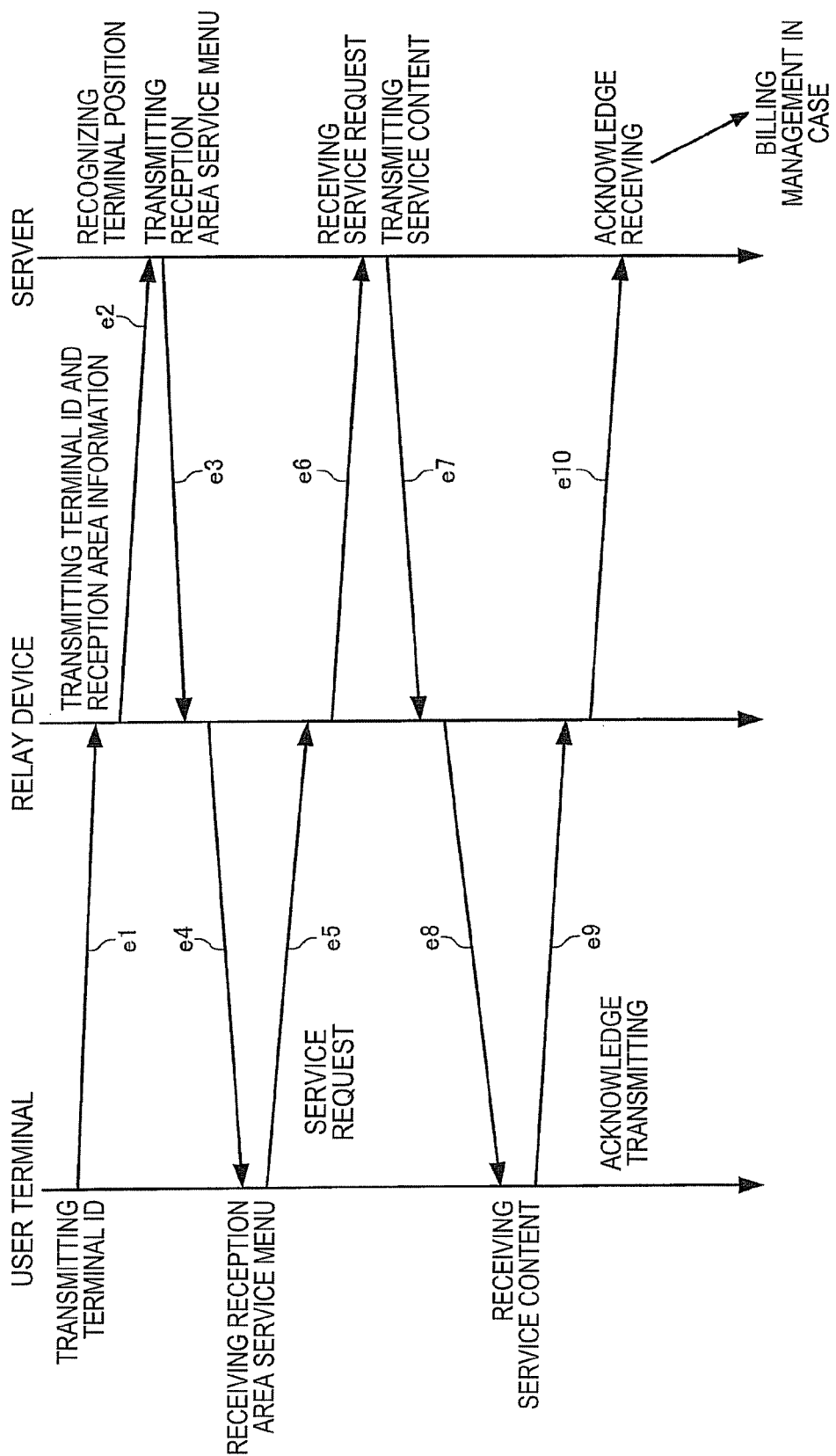
FIG. 16 is a diagram for explaining a communication operation of the communication system.

FIG. 16 is a diagram for explaining a communication operation of the communication system according to the embodiment.

A case where the mobile communication terminal downloads data from the server will be described with reference to FIG. 16.

The mobile communication terminal transmits data e1 including the terminal ID of its own device.

If the relay device placed in an area where it can communicate with the concerned mobile communication terminal receives the data e1, the relay device transmits data e2 including the terminal ID and information on a reception area (the information may be the terminal ID of the relay device) to the server device.

The server device that receives the data e2 from the relay device recognizes a position of the mobile communication terminal. If necessary, the server device may update the position information of terminal information of the database. Then the server device transmits reception area service menu data e3 that is a service menu prepared for each reception area. The relay device that receives the reception area service menu data e3 transmits data e4 corresponding to the reception area service menu data e3 by a long wave.

The mobile communication terminal that receives the data e4 corresponding to the reception area service menu data e3 transmits service request data e5.

If the relay device that is placed in the area where it can communicate with the concerned mobile communication terminal receives the data e5, the relay device transmits corresponding data e6 to the server device.

The server device that receives the data e6 from the relay device transmits service content data e7 including a content corresponding to the service request. The relay device that receives the service content data e7 transmits data e8 corresponding to the service content data e7 by a long wave.

The mobile communication terminal that receives the data e8 corresponding to the service content data e7 transmits acknowledge data e9.

If the relay device that is placed in the area where it can communicate with the concerned mobile communication terminal receives the acknowledge data e9, the relay device transmits corresponding data e10 to the server device.

For example, in a case where a mobile communication terminal communicates with another mobile communication terminal by one-to-one in an area where there is no infrastructure for the relay device, the one mobile communication terminal enters the reception mode to confirm that there is no other devices that transmit to the one mobile communication terminal. Then the one mobile communication terminal enters the transmission mode so as to wait return data from other mobile communication terminals.

Figure 17:
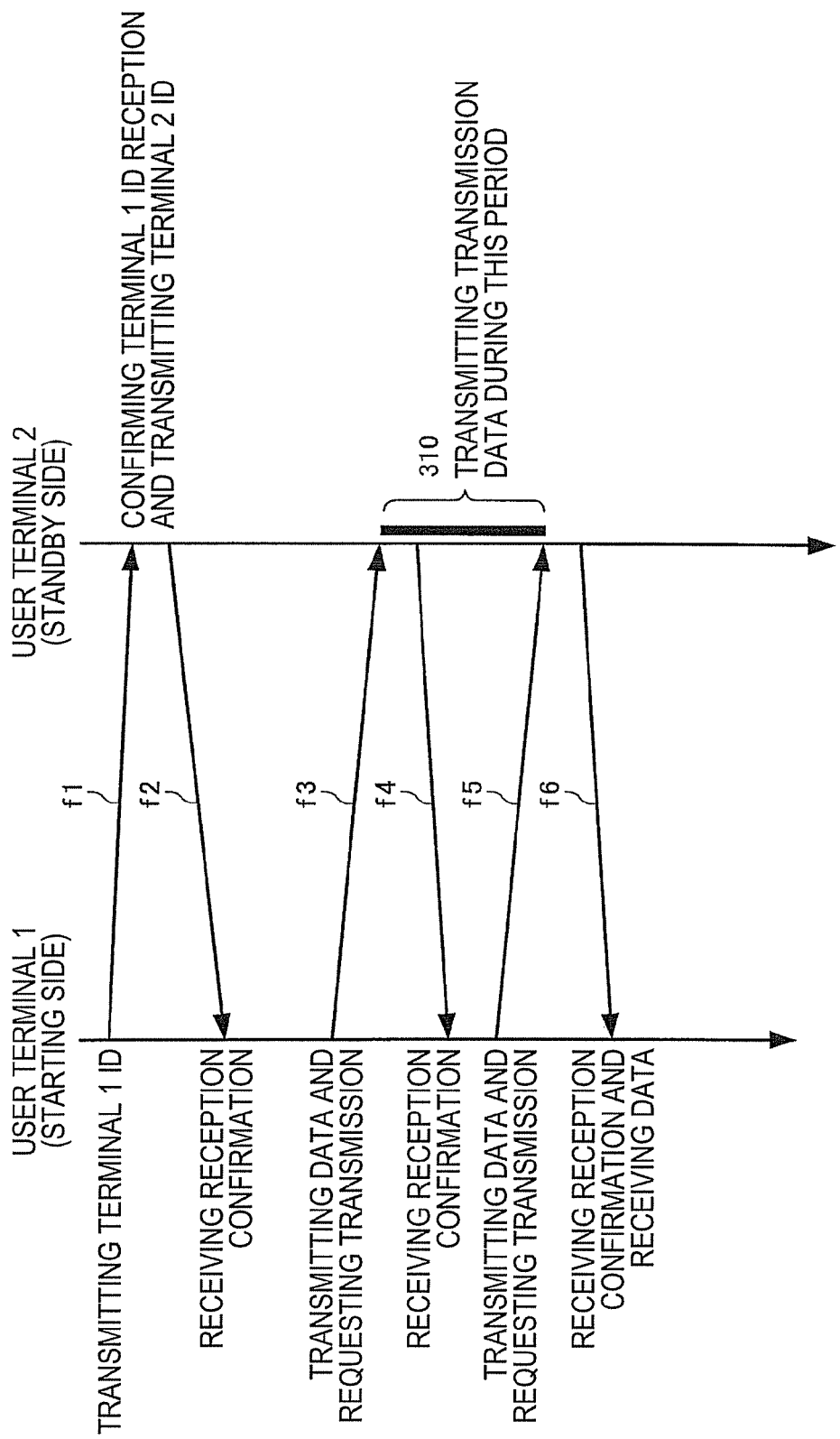
FIG. 17 is a diagram showing a flow of communication data in a case where mobile communication terminals are coupled by one-to-one.

FIG. 17 is a diagram showing a flow of the communication data in a case where the mobile communication terminals are coupled by one-to-one.

A mobile communication terminal 1 that confirms no other devices transmit to the terminal 1 broadcasts data f1 including a terminal 1 ID that is the own terminal ID.

If a mobile communication terminal 2 that is present in an area where the terminal 2 can receive the data f1 receives the data f1 including the terminal 1 ID, the terminal 2 figures out the presence of the mobile communication terminal 1. The terminal 2 transmits data f2 (reception confirmation) including a terminal 2 ID that is the own terminal ID to the terminal 1 in unicast so as to notify the presence of the own device.

The terminal 1 that receives the data f2 transmits data transmission and transmission request f3 in unicast to the terminal 2.

The terminal 2 transmits data f4 including the reception confirmation and other data to the terminal 1 in unicast within a predetermined period after the reception of the data transmission and transmission request f3.

The terminal 1 that receives the data f4 transmits data transmission and transmission request f5 in unicast to the terminal 2.

The terminal 2 transmits data f6 including the reception confirmation and other data to the terminal 1 in unicast within the predetermined period after the reception of the data transmission and transmission request f5.

While the preferred embodiment to which the present invention is applied has been described, the application of the present invention is not confined to the above-mentioned example.

The present invention is not limited to the above mentioned embodiment, and various modifications can be made without departing from the spirit and scope of the invention.

Application of the communication system of the present invention enables the following information communication.

The system may detect that a member of a group enters an accessible area so as to notify the entering to all of the members (member login). Further, the system may detect that a member of a group enters a specified area so as to notify the entering to all of the members. Each of the mobile communication terminals 20 may store an area where each of the members is present and display it as necessary.

Further, the system may detect that a member of the group goes out to a non-accessible area so as to notify the going out to all of the members (member logout). With the system, a member of the group may download information from a specified access point. Particularly, the system may have the following structure. If the system detects that the mobile communication terminal 20 reaches the specified access point (if a communication between the relay device and the terminal 20 is detected under a state that the relay device is placed at the specified access point), the mobile communication terminal 20 can download specified information (priority admission information for an attraction, for example).

Further, a member of the group may be permitted to enter a specified region based on the specified information that the member has downloaded. Furthermore, the information that is downloaded may be transmitted to all of the members from a member of the group.

Information, for example "xx junior high school trip, get together at the front gate at 3 o'clock", may be transmitted to all of the specified group members from a server manager.

Further, an emergency alert and the like may be broadcasted to all terminals from the server manager. Further the system may be constructed such that the mobile communication terminal performs an inquiry to the server so as to receive information that the server maintains.

While the main application of the embodiment is a multipurpose LCD game with which entering and leaving management and information exchange between group members can be executed in a facility such as an arcade or a theme park, the invention is applicable to medical and health equipment, watch, and the like.

What is claimed is:

1. A communication system, comprising:
 a plurality of mobile communication terminals;
 a server device; and
 a plurality of relay devices, each of the plurality of relay devices performing a relay between at least one of the plurality of mobile communication terminals and the server device,
 wherein each of the plurality of mobile communication terminals includes:

a communication unit transmitting and receiving a first long wave wireless signal including information, and a processing unit performing a predetermined process based on the information received from the relay devices;

wherein each of the plurality of relay devices includes:

a first communication unit transmitting and receiving a second long wave wireless signal with respect to at least one of the plurality of mobile communication terminals, a second communication unit communicating with the server device, and a relay processing unit performing a relaying process in which information received from the server device via the second communication unit is transmitted to the at least one of the plurality of mobile communication terminals via the first communication unit, and a relaying process in which information received from the at least one of the plurality of mobile communication terminals via the first communication unit is relayed to the server device via the second communication unit;

wherein the server device includes:

a communication unit communicating with at least one of the plurality of relay devices, a group information storing unit storing group information on a group to which each of the plurality of mobile communication terminals belongs, and a group communication processing unit performing a group communication process in which any of the plurality of mobile communication terminals that belong to a predetermined group are extracted based on the group information so as to transmit predetermined information to the any of the plurality of mobile communication terminals that are extracted;

wherein the plurality of relay devices includes:

a first relay device that is placed at a first side of a predetermined gate and includes a first antenna capable of receiving a communication wave from the mobile communication terminals that are present in a predetermined area of the first side of the gate, and a second relay device that is placed at a second side, the second side being opposite to the first side, of the predetermined gate and includes a second antenna capable of receiving a communication wave from the mobile communication terminals that are present in a predetermined area of the second side of the gate; and wherein a terminal position management unit of the server device determines whether the mobile communication terminals pass the predetermined gate or not based on the information from the first relay device and the second relay device and performs an updating process to information on passage of the mobile communication terminals through the predetermined gate based on a result of the determination.

2. The communication system according to claim 1, wherein the relay devices include a call processing unit that performs calling transmission for confirming presence of the terminals therearound by predetermined timing and enters a reception mode for a predetermined period after the calling transmission so as to receive a response with respect to the calling transmission, and if the processing unit of the mobile communication terminals receives the calling transmission, the processing unit performs a transmission process for a response.

3. A mobile communication terminal that is used for the communication system according to claim 1.

4. The communication system according to claim 1, wherein the group communication processing unit of the server device transmits communication data to be transmitted to the plurality of the mobile communication terminals that belong to the predetermined group together with information for specifying the predetermined group in one of broadcast and multicast, and wherein the processing unit of the mobile communication terminals includes a belonging group information storing unit storing belonging group information for specifying an own belonging group, and determines whether the communication data that is received is for the own belonging group or not based on the belonging group information and information for specifying a predetermined group, the information for specifying a predetermined group being appended to the communication data which is received, and in a case where the processing unit determines that the information is for the own belonging group, the processing unit performs a predetermined process.

5. The communication system according to claim 4, wherein the terminal position management unit checks which of the plurality of relay devices receives the communication data from each of the plurality of mobile communication terminals and transmits the data to the server device so as to determine positions of the each of the plurality of mobile communication terminals and performs a position information updating process of the each of the plurality of mobile communication terminals based on a result of the determination.

6. The communication system according to claim 5, wherein the terminal position management unit of the server device determines whether information on a position of one mobile communication terminal satisfies a predetermined condition, and in a case where the information satisfies the predetermined condition, the terminal position management unit transmits notifying information to at least one of the one mobile communication terminal and other terminals belonging to a group to which the one mobile communication terminal belongs.

7. The communication system according to claim 5, wherein the terminal position management unit of the server device selects the relay device for the communication data to be transmitted to the mobile communication terminals based on the information on the positions of the mobile communication terminals so as to transmit the communication data to the mobile communication terminals via the relay device that is selected.

8. The communication system according to claim 5, wherein each of the relay devices includes a loop antenna capable of receiving a communication wave from the mobile communication terminals that are present in an area that is assigned to each of the relay devices, and the terminal position management unit of the server device checks which relay device receives the communication data from the mobile communication terminals and transmits the data to the server device so as to determine an area where the mobile communication terminals are present and performs the position information updating process of the information on the presence area of the mobile communication terminals based on a result of the determination.

* * * * *